US012168897B2

(12) United States Patent
Skiles

(10) Patent No.: US 12,168,897 B2
(45) Date of Patent: Dec. 17, 2024

(54) LOCKING SYSTEM FOR DOORS AND WINDOWS

(71) Applicant: Brisbin Marvin Skiles, Appalachacola, FL (US)

(72) Inventor: Brisbin Marvin Skiles, Appalachacola, FL (US)

( * ) Notice: Subject to any disclaimer, the term of this patent is extended or adjusted under 35 U.S.C. 154(b) by 0 days.

(21) Appl. No.: 18/348,847

(22) Filed: Jul. 7, 2023

(65) Prior Publication Data

US 2023/0349207 A1 Nov. 2, 2023

Related U.S. Application Data

(63) Continuation of application No. 16/154,682, filed on Oct. 8, 2018, now abandoned, which is a continuation of application No. 14/145,937, filed on Jan. 1, 2014, now Pat. No. 10,294,702.

(51) Int. Cl.

| | |
|---|---|
| ***E05C 1/12*** | (2006.01) |
| ***E05B 17/00*** | (2006.01) |
| ***E05B 17/20*** | (2006.01) |
| ***E05C 1/06*** | (2006.01) |
| ***E05C 9/00*** | (2006.01) |
| ***E05C 9/04*** | (2006.01) |
| ***E05C 9/06*** | (2006.01) |
| ***E05C 9/18*** | (2006.01) |

(52) U.S. Cl.

CPC ............ *E05C 1/12* (2013.01); *E05B 17/0062* (2013.01); *E05B 17/2092* (2013.01); *E05C 1/06* (2013.01); *E05C 9/006* (2013.01); *E05C 9/06* (2013.01); *E05C 9/185* (2013.01); *E05C 9/04* (2013.01)

(58) Field of Classification Search

CPC ...... E05C 1/12; E05B 65/0082; E05B 53/003; E05B 17/0062; E05B 65/0075; E05B 17/2084

See application file for complete search history.

(56) References Cited

U.S. PATENT DOCUMENTS

| | | | | | |
|---|---|---|---|---|---|
| 144,288 | A * | 11/1873 | Rand | E05B 53/003 | 292/38 |
| 410,728 | A * | 9/1889 | Brown | E05B 53/003 | 292/38 |
| 912,379 | A * | 2/1909 | Jackson | E05B 53/003 | 292/DIG. 60 |
| 1,094,143 | A * | 4/1914 | Hagstrom | E05B 65/0075 | 70/118 |
| 1,174,652 | A * | 3/1916 | Banks | E05B 7/00 | 292/34 |

(Continued)

*Primary Examiner* — Christine M Mills
*Assistant Examiner* — Faria F Ahmad
(74) *Attorney, Agent, or Firm* — Ariel S. Bentolila; Bay Area IP Group, LLC

(57) ABSTRACT

A system including a barrier implement, a barrier implement frame, wherein the barrier implement frame is configured to engage said barrier implement, a bolt lock, wherein the bolt lock is configured to secure the barrier implement frame to the barrier implement in a lock position, a central locking and/or release knob, a cable or rod, wherein the cable or rod is configured to interconnect the central locking and/or release knob and the bolt lock, and wherein the central locking and/or release knob is configured to release said bolt lock by pulling in the cable or rod to move the bolt lock out of the lock position.

20 Claims, 17 Drawing Sheets

(56) References Cited

U.S. PATENT DOCUMENTS

| | | | | |
|---|---|---|---|---|
| 1,341,038 | A * | 5/1920 | Bickel | E05C 9/021 70/120 |
| 1,596,992 | A * | 8/1926 | Ognowicz | E05C 9/043 292/37 |
| 2,188,532 | A * | 1/1940 | Dominguez | E05C 9/048 70/108 |
| 2,473,065 | A * | 6/1949 | Miller | E05C 9/06 292/37 |
| 4,037,440 | A * | 7/1977 | Shabtai | E05C 9/14 70/120 |
| 4,046,410 | A * | 9/1977 | Connell | E05C 9/16 292/66 |
| 4,426,858 | A * | 1/1984 | Interrante | E05B 77/44 292/225 |
| 4,432,573 | A * | 2/1984 | Goldman | E05C 9/12 292/37 |
| 5,394,718 | A * | 3/1995 | Hotzl | E05B 47/0012 292/144 |
| 5,992,107 | A * | 11/1999 | Poirier | E06B 5/10 52/203 |
| 6,679,013 | B2 * | 1/2004 | Hornung | E06B 3/5871 52/204.53 |
| 7,404,306 | B2 * | 7/2008 | Walls | E05C 9/185 70/451 |
| 8,789,324 | B2 * | 7/2014 | Hay | E06B 3/24 52/204.69 |
| 10,267,086 | B2 * | 4/2019 | Vander Bent | E06B 5/103 |
| 10,641,035 | B1 * | 5/2020 | Weber | E06B 5/12 |
| 11,441,333 | B2 * | 9/2022 | Tagtow | G07C 9/00174 |
| 2003/0061783 | A1 * | 4/2003 | Duncan | B32B 17/10018 52/786.13 |
| 2005/0126091 | A1 * | 6/2005 | Sherrett | E06B 7/12 52/204.6 |
| 2006/0093810 | A1 * | 5/2006 | Blake | C09J 7/25 427/532 |
| 2008/0157542 | A1 * | 7/2008 | O'Neill | E05C 9/16 292/159 |
| 2008/0190070 | A1 * | 8/2008 | Duncan | E06B 5/10 52/786.11 |
| 2008/0196317 | A1 * | 8/2008 | Duncan | E06B 5/10 49/506 |
| 2017/0247984 | A1 * | 8/2017 | Paulshus | F16L 55/1007 |

* cited by examiner

"Skiles Locking System" S.L.S.

LOCKING SYSTEM FOR DOORS AND WINDOWS

CROSS-REFERENCE TO RELATED APPLICATIONS

The present continuation patent application claims priority benefit of the U.S. nonprovisional patent application Ser. No. 14/145,937 entitled "Skiles Locking System" filed 1 Jan. 2014 under 35 U.S.C. 119(e) and further claims priority to the U.S. nonprovisional patent application Ser. No. 16/154,682 entitled "Door Locking Device" filed 8 Oct. 2018. The contents of these related patent applications are incorporated herein by reference for all purposes to the extent that such subject matter is not inconsistent herewith or limiting hereof.

RELATED CO-PENDING U.S. PATENT APPLICATIONS

Not applicable.

INCORPORATION BY REFERENCE OF SEQUENCE LISTING PROVIDED AS A TEXT FILE

Not applicable.

FEDERALLY SPONSORED RESEARCH OR DEVELOPMENT

Not applicable.

REFERENCE TO SEQUENCE LISTING, A TABLE, OR A COMPUTER LISTING APPENDIX

Not applicable.

COPYRIGHT NOTICE

A portion of the disclosure of this patent document contains material that is subject to copyright protection by the author thereof. The copyright owner has no objection to the facsimile reproduction by anyone of the patent document or patent disclosure for the purposes of referencing as patent prior art, as it appears in the Patent and Trademark Office, patent file or records, but otherwise reserves all copyright rights whatsoever.

BACKGROUND OF THE RELEVANT PRIOR ART

Field of the Invention

One or more embodiments of the invention generally relate to locking systems. More particularly, certain embodiments of the invention relate to locking systems utilizing multiple spring-loaded sliding bolts and multiple spring-loaded floating locks within the spring-loaded sliding bolts.

Background Art

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

An embodiment of the present invention referred to as the Skiles Locking System, S.L.S. incorporates an existing Kwikset tubular locking cylinder in its operation. The S.L.S. Locking System further utilizes multiple internal spring-loaded sliding bolts and also multiple internal spring-loaded floating locks within the spring-loaded sliding bolts, unlike the Kwikset tubular system.

In some embodiments a door may be easily closed and locked just by pushing the door on its hinges into its frame and activating a singular door lock mechanism from either "inside or outside" of the dwelling. This is unlike a previously disclosed system by Saunders, which can only be manually activated and locked once inside.

In view of the foregoing, it is clear that these traditional techniques are not perfect and leave room for more optimal approaches.

BRIEF DESCRIPTION OF THE DRAWINGS

The present invention is illustrated by way of example, and not by way of limitation, in the figures of the accompanying drawings and in which like reference numerals refer to similar elements and in which.

Unless otherwise indicated illustrations in the figures are not necessarily drawn to scale.

LIST OF COMPONENTS

Figure 1:
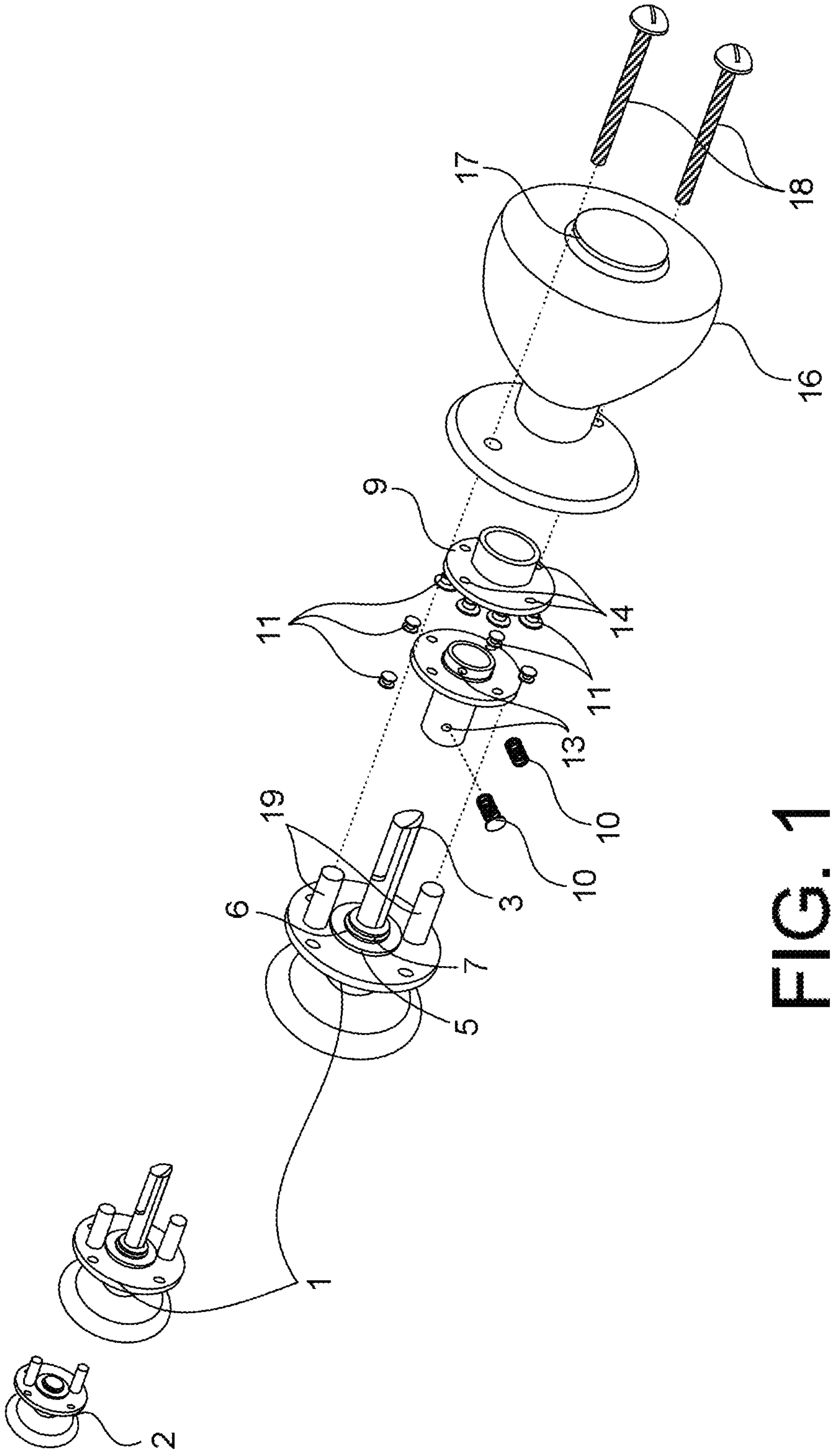
FIG. 1—Skiles Locking System mechanism incorporated into a Kwikset tubular locking cylinder.
Figure 2:
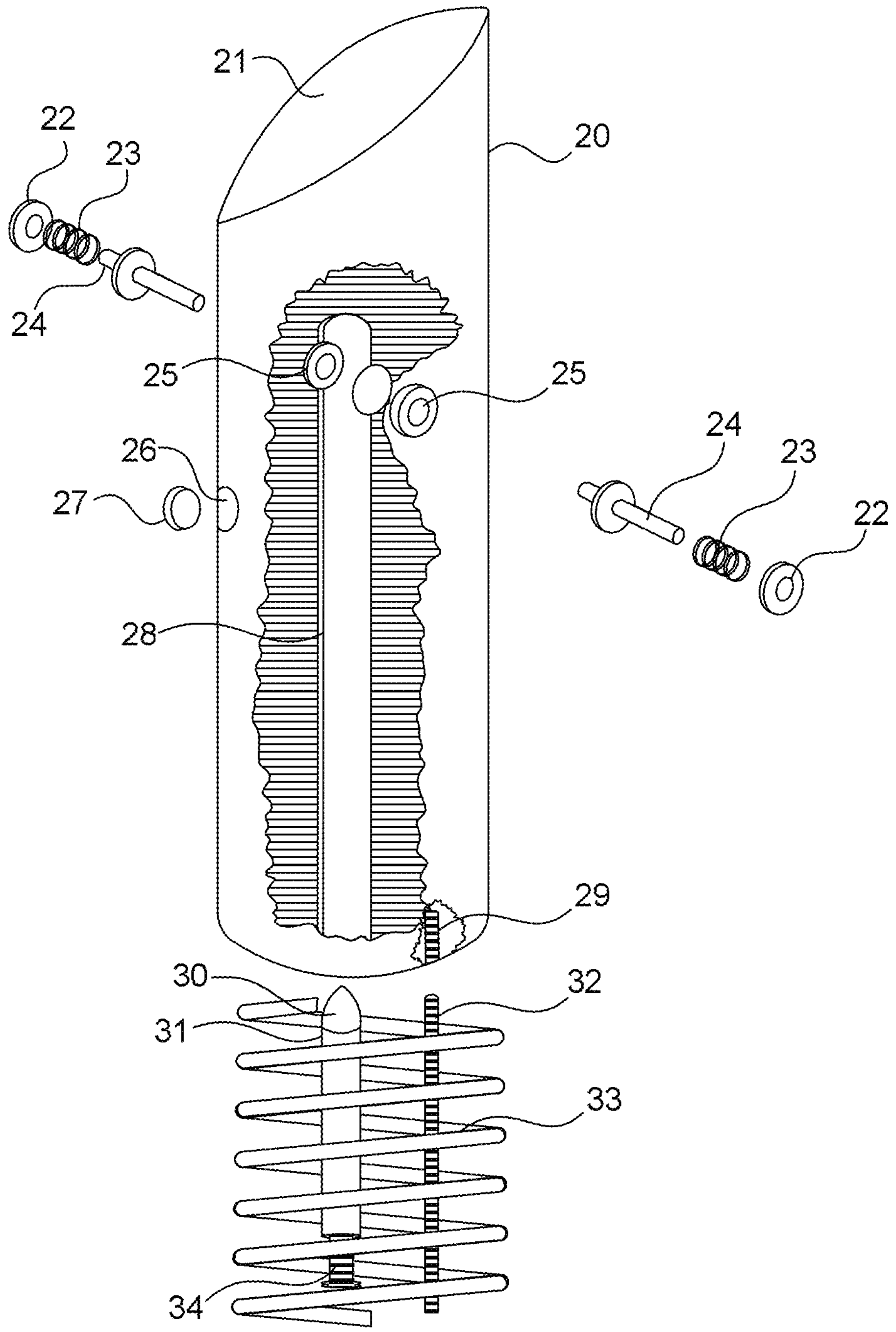
FIG. 2—Internal spring-loaded sliding bolts
Figure 3:
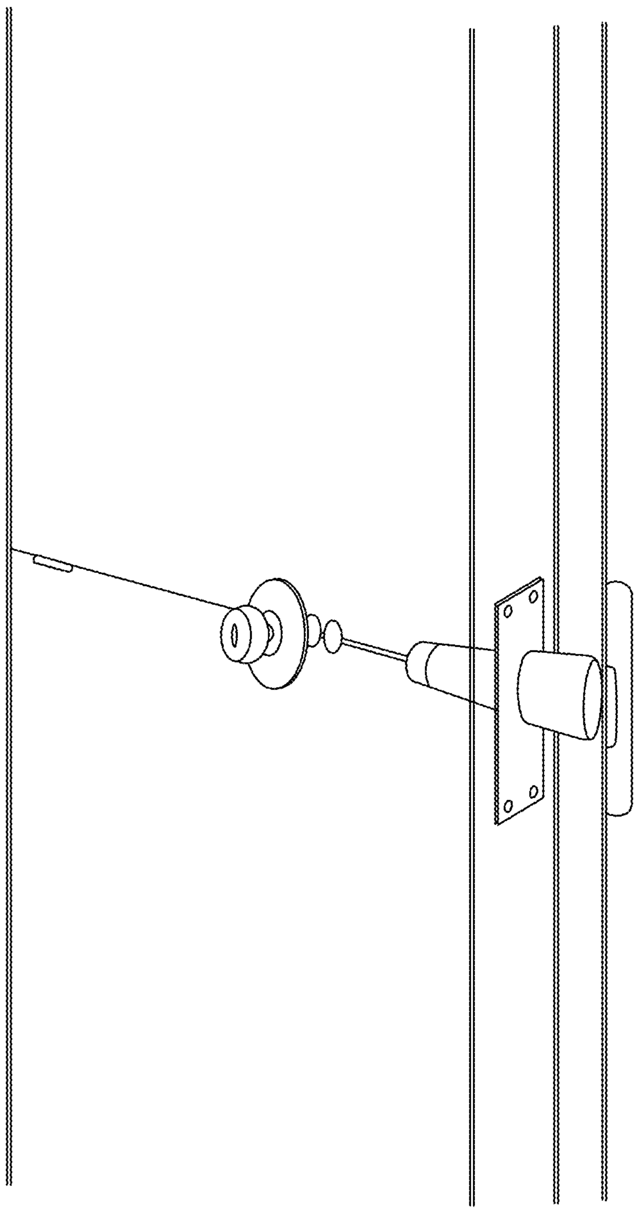
FIG. 3—S.L.S. door locking mechanism (open)
Figure 4:
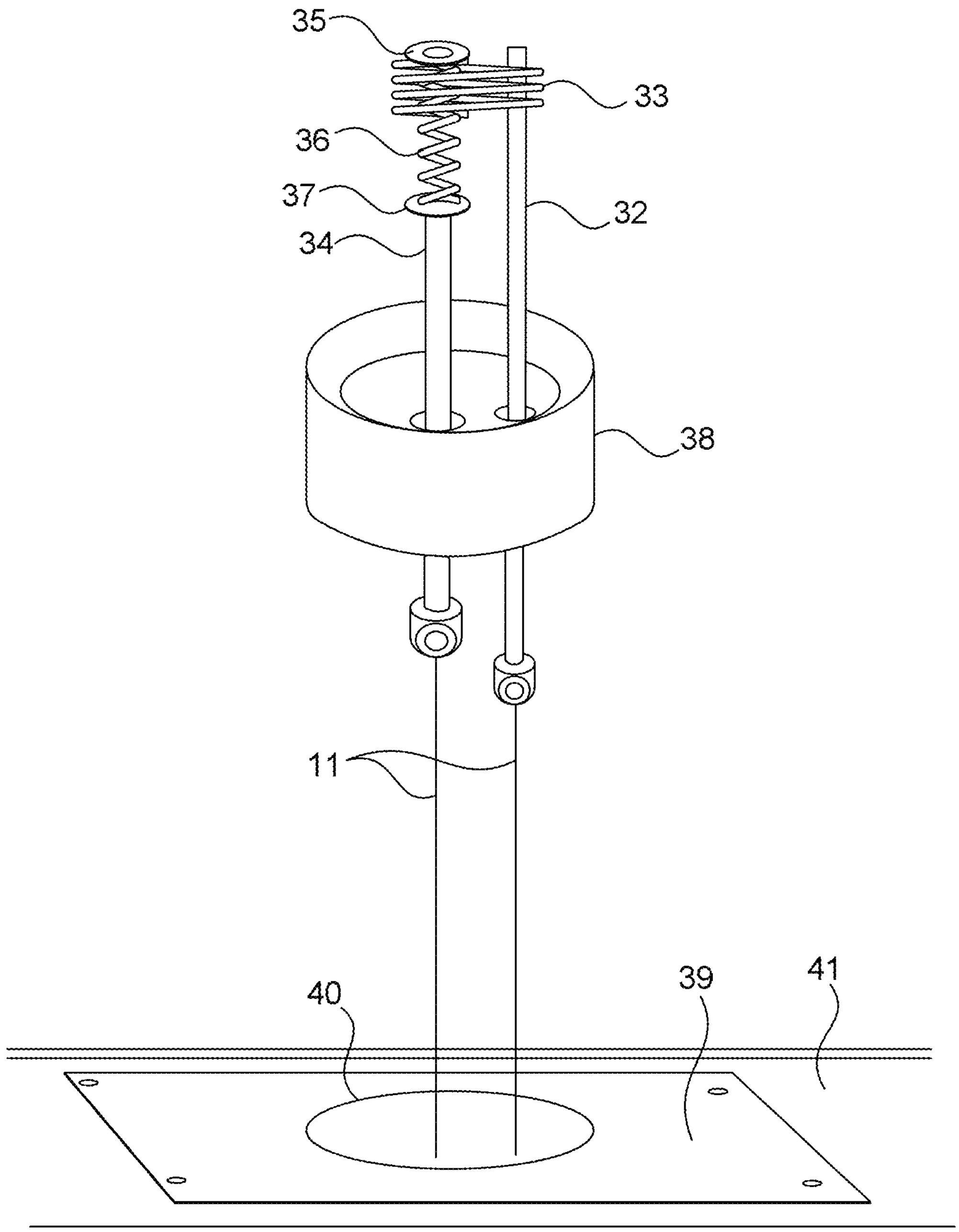
FIG. 4—Internal spring-loaded connecting rods, connecting wires, brass end cap, and brass face plate FIG. 5—Multiple internal spring-loaded bolt door (closed & locked, open & unlocked position)
Figure 5:
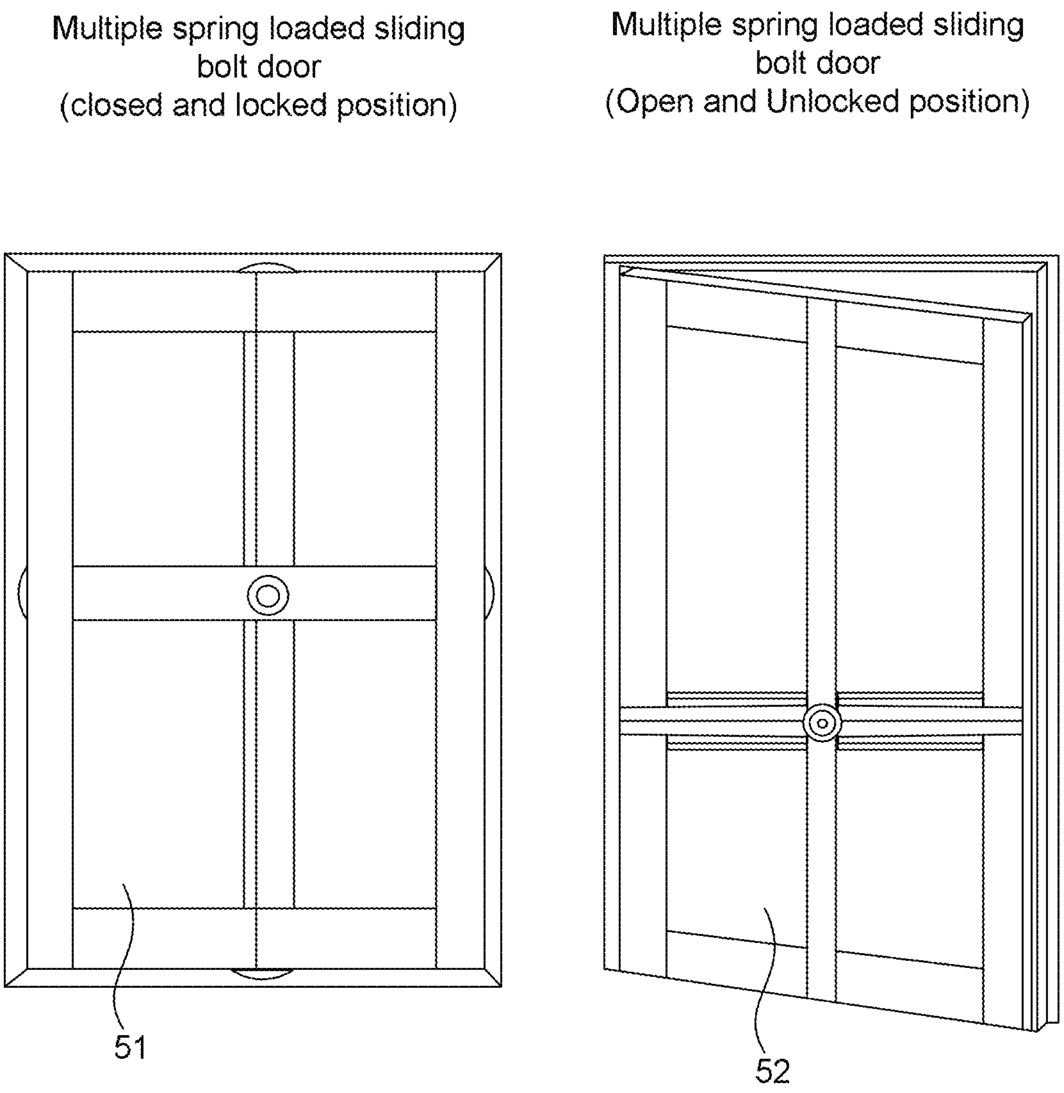
Figure 6:
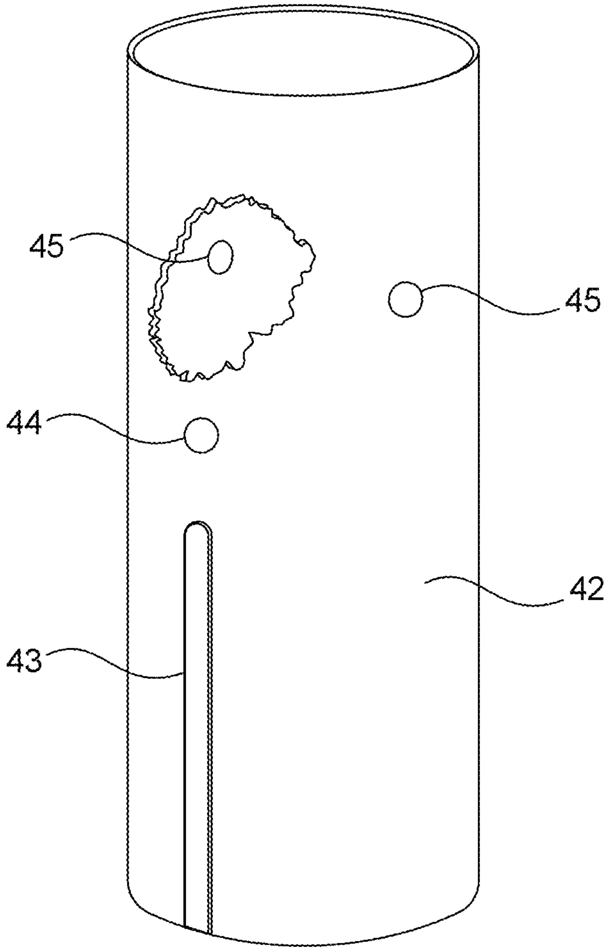
FIG. 6—Internal spring-loaded sliding bolts steel sleeve
Figure 7:
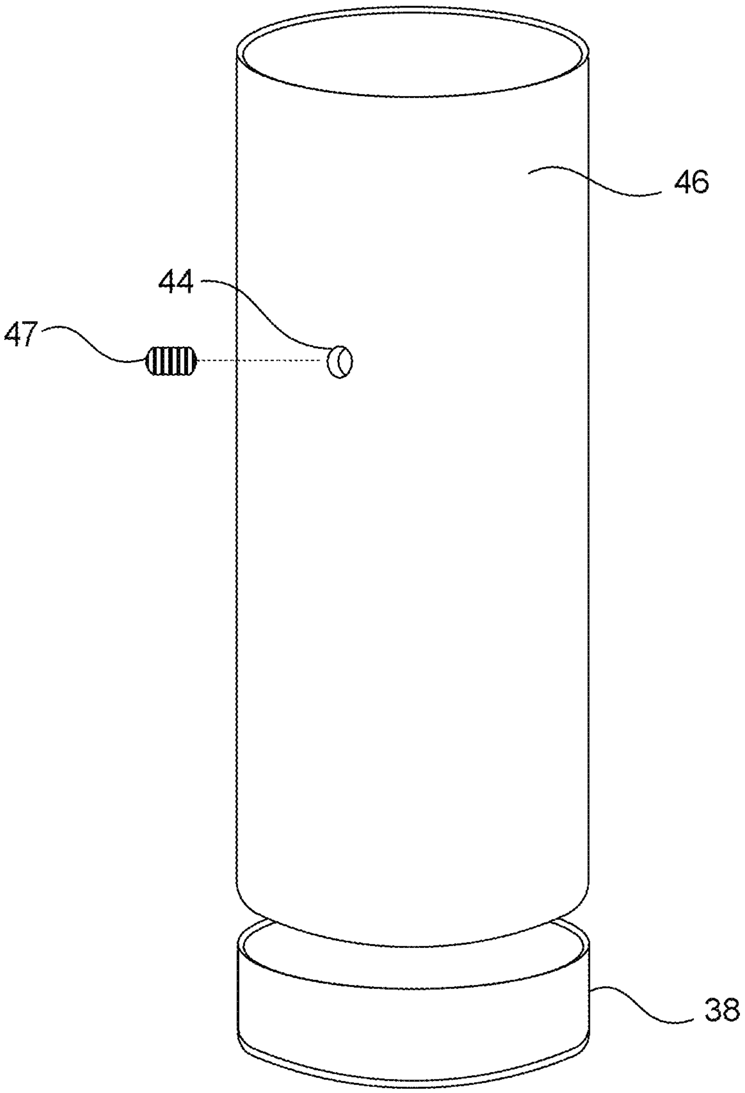
FIG. 7—Brass containment cylinder
Figure 8:
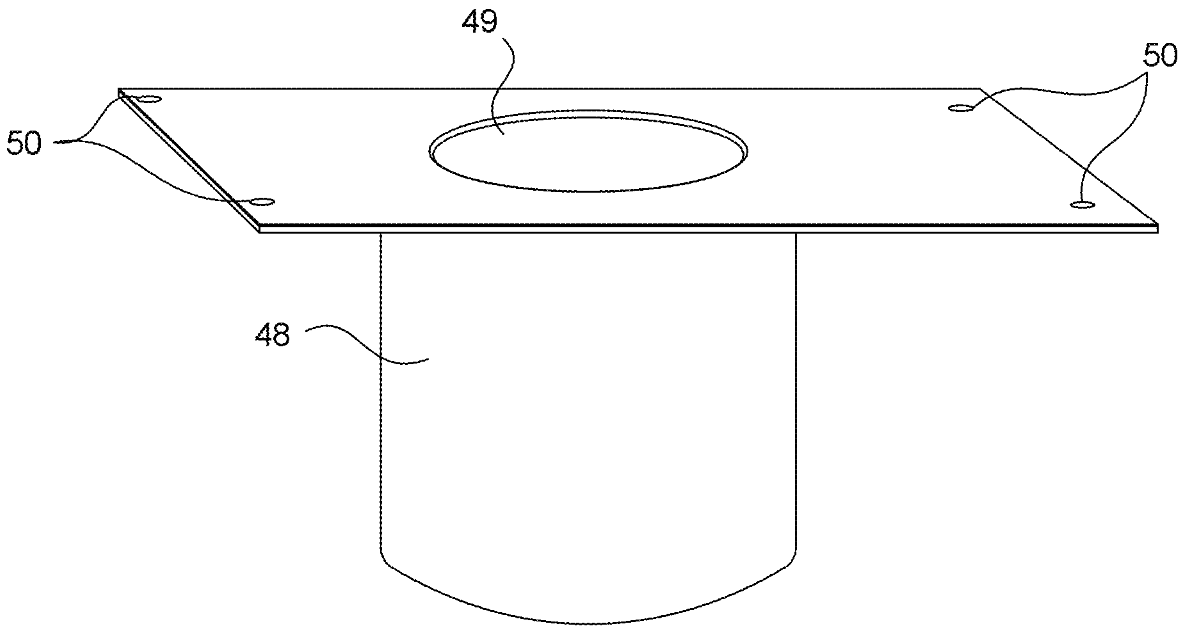
FIG. 8—Brass containment face plate
Figure 12:
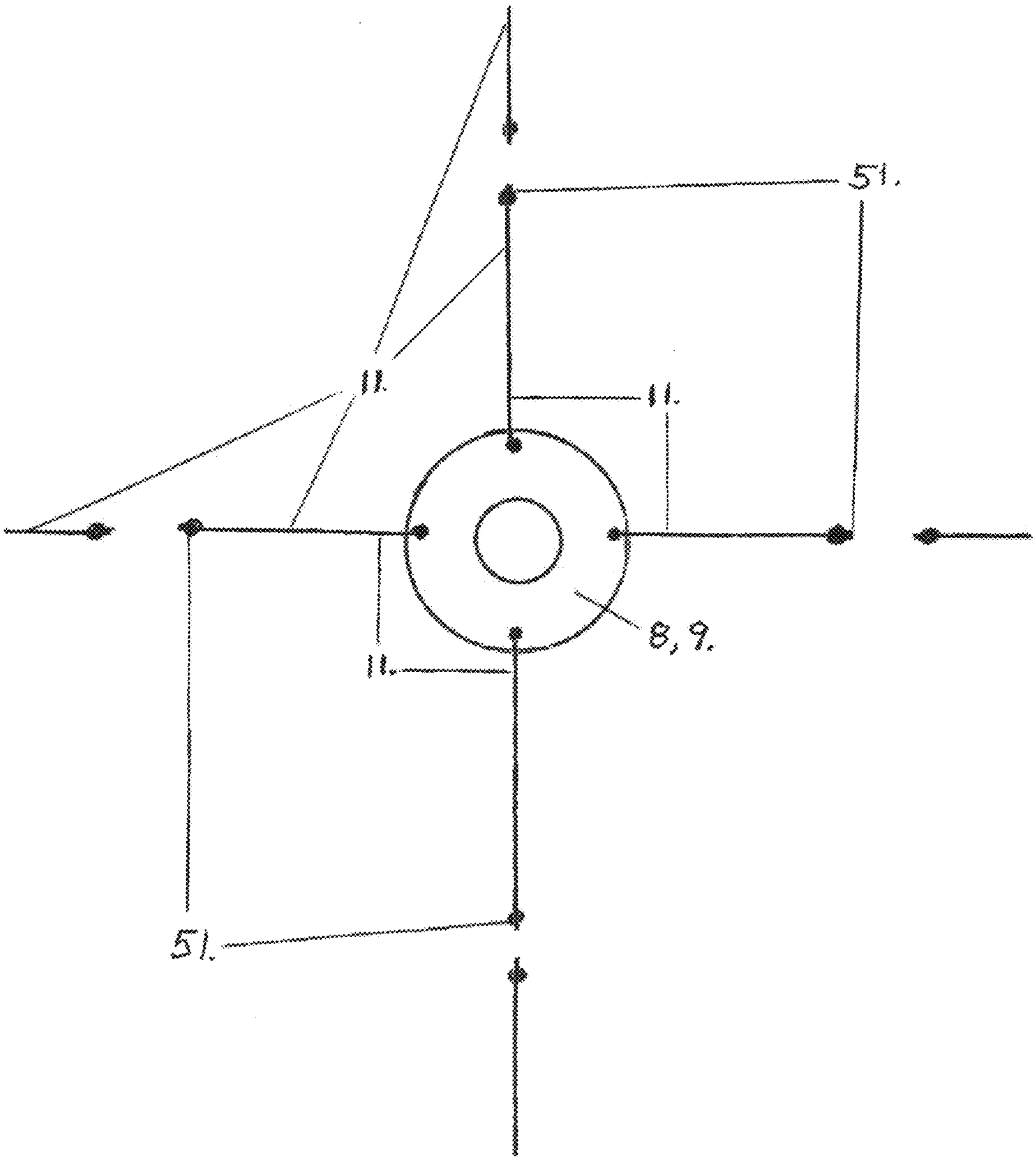
FIG. 12—S.L.S. Rotating disc (8, 9) "Weak-link" connection broken
Figure 13:
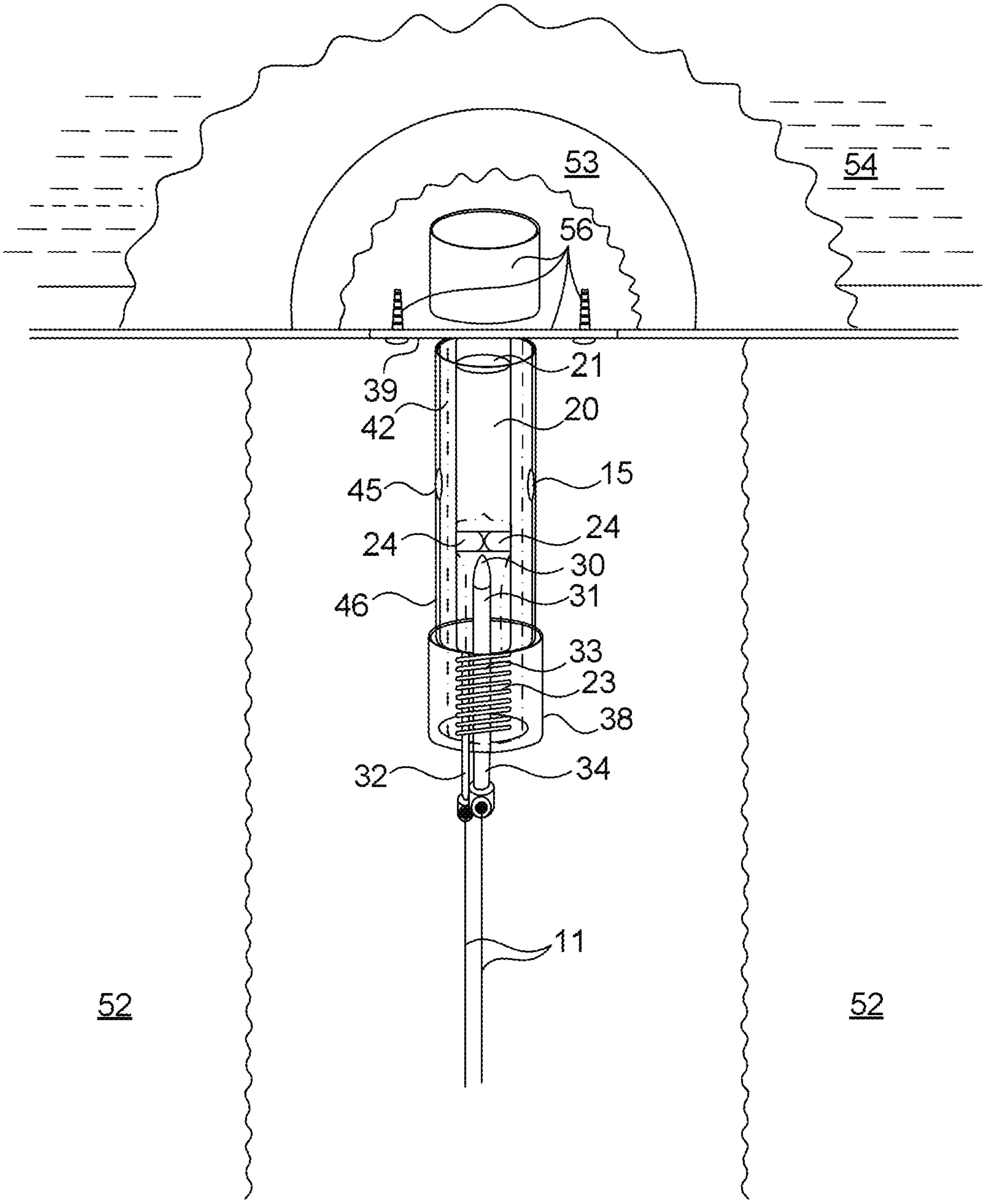
FIG. 13—S.L.S. Internal Locking System Bolt Mechanism (unlocked position within door and frame)

FIG. 1 Skiles Locking System Mechanism
1. Kwikset tubular locking cylinder
2. Locking tumbler set (key or "electronic keyless")
3. Kwikset rotating half-shaft
4. Kwikset round spindle
5. Kwikset locking mechanism
6. Locking spindle assembly—Kwikset
7. Locking spindle assembly—Kwikset
8. S.L.S. rotating disc for internal spring-loaded floating locks
9. S.L.S. rotating disc for internal spring-loaded sliding bolts
10. Attachment screws (floating lock disc to round spindle (4)
11. Steel connecting wires
12. Brass screws, Brass washers
13. Threaded connecting holes (attachment screws) (10)
14. Threaded connecting holes (attach steel connecting wires) (11)
15. Threaded connecting holes (attach steel connecting wires) (11)
16. Interior doorknob
17. Button lock
18. Connecting bolts (inside doorknob to outside doorknob assembly)
19. Connecting bolts (18) threaded base
FIG. 2 Internal spring-loaded sliding bolts
20. Internal spring-loaded sliding bolt
21. Beveled face
22. Floating lock retaining ring
23. Internal floating lock spring
24. Internal floating lock pin
25. Horizontal floating lock shaft access
26. Ball bearing
27. Ball bearing retaining hole
28. Floating lock separator pinion access hole
29. Threaded hole (for sliding bolt connecting rod (32)
30. Tapered point of separator pinion
31. Separator pinion
32. Sliding bolt connecting rod (threaded)
33. Internal spring-loaded sliding bolt spring
34. Separator pinion connecting rod (threaded)
FIG. 3 S.L.S. door locking mechanism (open)
FIG. 4 Internal spring-loaded connecting rods, connecting wires, brass end cap, and brass face plate
11. Steel connecting wires
32. Internal spring-loaded sliding bolt connecting rod
33. Internal spring-loaded sliding bolt spring
34. Internal floating lock separator pinion connecting rod
35. Separator pinion spring tension nut
36. Floating lock separator pinion spring
37. Separator pinion spring retaining washer
38. Brass end cap (attaches to brass containment cylinder)
39. Brass face plate mounting surface on door (mortised)
40. Drilled access hole for spring loaded sliding bolt assembly in door
41. Door edge
FIG. 5 Multiple internal spring-loaded bolt door (closed & locked, open & unlocked position)
51. Multiple internal spring-loaded sliding bolt door (closed and locked position)
52. Multiple internal spring-loaded sliding bolt door (open and unlocked position)
FIG. 6 Internal spring-loaded sliding bolts steel sleeve
42. Internal spring-loaded sliding bolt steel sleeve
43. Alignment groove for ball bearing (26)
44. Alignment screw hole—threaded for brass containment cylinder alignment screw (47)
45. Internal spring-loaded floating lock locking holes
FIG. 7 Brass containment cylinder
38. Brass containment cylinder end cap
44. Alignment screw hole—threaded for spring loaded sliding bolt steel sleeve
46. Brass containment cylinder
47. Steel sleeve alignment screw
FIG. 8 Brass containment face plate
48. Brass containment face plate
49. Sliding bolt access hole
50. Face plate holes for door application
FIG. 9 S.L.S. Door-Knob Mechanism (Compromised)
11. Steel connecting wires
51. "Weak-link" connectors broken (by force)
52. Door
FIG. 10 S.L.S. Rotating Disc (8,9)
11. Steel connecting wires
55. "Weak-link" connectors
FIG. 11 S.L.S. Internal locking system bolt mechanism (Locked position within door frame.)
11. Steel connecting wires
20. Internal spring-loaded sliding bolt
21. Beveled face
23. Internal floating lock spring
24. Internal floating lock pin
30. Tapered point of separator pinion
31. Separator pinion
32. Internal spring-loaded sliding bolt connecting rod
33. Internal spring-loaded sliding bolt spring
34. Internal floating lock separator pinion connecting rod
38. Brass end cap (attaches to brass containment cylinder)
39. Brass face plate mounting surface on door (mortised)
42. Internal spring-loaded sliding bolt steel sleeve
45. Internal spring-loaded floating lock locking holes
46. Brass containment cylinder
52. Door
53. Steel insertion plate
54. Door frame
56. Strike plate and screws
FIG. 12 S.L.S. Rotating disc (8,9)
11. Steel connecting wires (separated)
51. "Weak-link" connectors (broken by force)
FIG. 13. S.L.S. Internal Locking System Bolt Mechanism (unlocked position within door and frame)
11. Steel connecting wires
20. Internal spring-loaded sliding bolt
21. Beveled face
23. Internal floating lock spring
24. Internal floating lock pin
30. Tapered point of separator pinion
31. Separator pinion
32. Internal spring-loaded sliding bolt connecting rod
33. Internal spring-loaded sliding bolt spring
34. Internal floating lock separator pinion connecting rod
38. Brass end cap (attaches to brass containment cylinder)
39. Brass face plate mounting surface on door (mortised)
42. Internal spring-loaded sliding bolt steel sleeve
45. Internal spring-loaded floating lock locking holes
46. Brass containment cylinder
52. Door

53. Steel insertion plate
54. Door frame
56. Strike plate and screws
FIG. 14 Locking system window installation
1400. Locking system
1405. Window
1410. Window frame
1415. Screen
1420. Internally spring-loaded bolt locks
1425. Central locking/release knob
1430. "Weak-link" cables or rods
FIG. 15. Locking system window installation
1500. Locking system
1505. Window
1510. Window frame
1520. Internally spring-loaded bolt lock
1525. Central locking/release knob
1530. "Weak-link" cables or rods
FIG. 16 Locking system window installation—exploded view
1600. Locking system
1605. External sheet of glass
1610. Window frame
1615. Screen
1620. Internal sheet of glass
FIG. 17. "kit" form package block to install a locking system on new and existing doors
1700. Installation block

DETAILED DESCRIPTION OF SOME EMBODIMENTS

The present invention is best understood by reference to the detailed figures and description set forth herein.

Embodiments of the invention are discussed below with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

It is to be further understood that the present invention is not limited to the particular methodology, compounds, materials, manufacturing techniques, uses, and applications, described herein, as these may vary. It is also to be understood that the terminology used herein is used for the purpose of describing particular embodiments only and is not intended to limit the scope of the present invention. It must be noted that as used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" is a reference to one or more steps or means and may include sub-steps and subservient means. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

All words of approximation as used in the present disclosure and claims should be construed to mean "approximate," rather than "perfect," and may accordingly be employed as a meaningful modifier to any other word, specified parameter, quantity, quality, or concept. Words of approximation, include, yet are not limited to terms such as "substantial", "nearly", "almost", "about", "generally", "largely", "essentially", "closely approximate", etc.

As will be established in some detail below, it is well settled law, as early as 1939, that words of approximation are not indefinite in the claims even when such limits are not defined or specified in the specification.

For example, see Ex parte Mallory, 52 USPQ 297, 297 (Pat. Off. Bd. App. 1941) where the court said "The examiner has held that most of the claims are inaccurate because apparently the laminar film will not be entirely eliminated. The claims specify that the film is "substantially" eliminated and for the intended purpose, it is believed that the slight portion of the film which may remain is negligible. We are of the view, therefore, that the claims may be regarded as sufficiently accurate."

Note that claims need only "reasonably apprise those skilled in the art" as to their scope to satisfy the definiteness requirement. See Energy Absorption Sys., Inc. v. Roadway Safety Servs., Inc., Civ. App. 96-1264, slip op. at 10 (Fed. Cir. Jul. 3, 1997) (unpublished) Hybridtech v. Monoclonal Antibodies, Inc., 802 F.2d 1367, 1385, 231 USPQ 81, 94 (Fed. Cir. 1986), cert. denied, 480 U.S. 947 (1987). In addition, the use of modifiers in the claim, like "generally" and "substantial," does not by itself render the claims indefinite. See Seattle Box Co. v. Industrial Crating & Packing, Inc., 731 F.2d 818, 828-29, 221 USPQ 568, 575-76 (Fed. Cir. 1984).

Moreover, the ordinary and customary meaning of terms like "substantially" includes "reasonably close to: nearly, almost, about", connoting a term of approximation. See In re Frye, Appeal No. 2009-006013, 94 USPQ2d 1072, 1077, 2010 WL 889747 (B.P.A.I. 2010) Depending on its usage, the word "substantially" can denote either language of approximation or language of magnitude. Deering Precision Instruments, L.L.C. v. Vector Distribution Sys., Inc., 347 F.3d 1314, 1323 (Fed. Cir. 2003) (recognizing the "dual ordinary meaning of th[e] term ["substantially"] as connoting a term of approximation or a term of magnitude"). Here, when referring to the "substantially halfway" limitation, the Specification uses the word "approximately" as a substitute for the word "substantially" (Fact 4). (Fact 4). The ordinary meaning of "substantially halfway" is thus reasonably close to or nearly at the midpoint between the forwardmost point of the upper or outsole and the rearwardmost point of the upper or outsole.

Similarly, the term 'substantially' is well recognized in case law to have the dual ordinary meaning of connoting a term of approximation or a term of magnitude. See Dana Corp. v. American Axle & Manufacturing, Inc., Civ. App. 04-1116, 2004 U.S. App. LEXIS 18265, *13-14 (Fed. Cir. Aug. 27, 2004) (unpublished). The term "substantially" is commonly used by claim drafters to indicate approximation. See Cordis Corp. v. Medtronic AVE Inc., 339 F.3d 1352, 1360 (Fed. Cir. 2003) ("The patents do not set out any numerical standard by which to determine whether the thickness of the wall surface is 'substantially uniform.' The term 'substantially,' as used in this context, denotes approximation. Thus, the walls must be of largely or approximately uniform thickness."); see also Deering Precision Instruments, LLC v. Vector Distribution Sys., Inc., 347 F.3d 1314, 1322 (Fed. Cir. 2003); Epcon Gas Sys., Inc. v. Bauer Compressors, Inc., 279 F.3d 1022, 1031 (Fed. Cir. 2002). We find that the term "substantially" was used in just such a manner in the claims of the patents-in-suit: "substantially uniform wall thickness" denotes a wall thickness with approximate uniformity.

It should also be noted that such words of approximation as contemplated in the foregoing clearly limits the scope of claims such as saying 'generally parallel' such that the adverb 'generally' does not broaden the meaning of parallel. Accordingly, it is well settled that such words of approximation as contemplated in the foregoing (e.g., like the phrase 'generally parallel') envisions some amount of deviation from perfection (e.g., not exactly parallel), and that such words of approximation as contemplated in the foregoing are descriptive terms commonly used in patent claims to avoid a strict numerical boundary to the specified parameter. To the extent that the plain language of the claims relying on such words of approximation as contemplated in the foregoing are clear and uncontradicted by anything in the written description herein or the figures thereof, it is improper to rely upon the present written description, the figures, or the prosecution history to add limitations to any of the claim of the present invention with respect to such words of approximation as contemplated in the foregoing. That is, under such circumstances, relying on the written description and prosecution history to reject the ordinary and customary meanings of the words themselves is impermissible. See, for example, Liquid Dynamics Corp. v. Vaughan Co., 355 F.3d 1361, 69 USPQ2d 1595, 1600-01 (Fed. Cir. 2004). The plain language of phrase 2 requires a "substantial helical flow." The term "substantial" is a meaningful modifier implying "approximate," rather than "perfect." In Cordis Corp. v. Medtronic AVE, Inc., 339 F.3d 1352, 1361 (Fed. Cir. 2003), the district court imposed a precise numeric constraint on the term "substantially uniform thickness." We noted that the proper interpretation of this term was "of largely or approximately uniform thickness" unless something in the prosecution history imposed the "clear and unmistakable disclaimer" needed for narrowing beyond this simple-language interpretation. Id. In Anchor Wall Systems v. Rockwood Retaining Walls, Inc., 340 F.3d 1298, 1311 (Fed. Cir. 2003)" Id. at 1311. Similarly, the plain language of claim 1 requires neither a perfectly helical flow nor a flow that returns precisely to the center after one rotation (a limitation that arises only as a logical consequence of requiring a perfectly helical flow).

The reader should appreciate that case law generally recognizes a dual ordinary meaning of such words of approximation, as contemplated in the foregoing, as connoting a term of approximation or a term of magnitude, e.g., see Deering Precision Instruments, L.L.C. v. Vector Distrib. Sys., Inc., 347 F.3d 1314, 68 USPQ2d 1716, 1721 (Fed. Cir. 2003), cert. denied, 124 S. Ct. 1426 (2004) where the court was asked to construe the meaning of the term "substantially" in a patent claim. Also see Epcon, 279 F.3d at 1031 ("The phrase 'substantially constant' denotes language of approximation, while the phrase 'substantially below' signifies language of magnitude, i.e., not insubstantial."). Also, see, e.g., Epcon Gas Sys., Inc. v. Bauer Compressors, Inc., 279 F.3d 1022 (Fed. Cir. 2002) (construing the terms "substantially constant" and "substantially below"); Zodiac Pool Care, Inc. v. Hoffinger Indus., Inc., 206 F.3d 1408 (Fed. Cir. 2000) (construing the term "substantially inward"); York Prods., Inc. v. Cent. Tractor Farm & Family Ctr., 99 F.3d 1568 (Fed. Cir. 1996) (construing the term "substantially the entire height thereof"); Tex. Instruments Inc. v. Cypress Semiconductor Corp., 90 F.3d 1558 (Fed. Cir. 1996) (construing the term "substantially in the common plane"). In conducting their analysis, the court instructed to begin with the ordinary meaning of the claim terms to one of ordinary skill in the art. Prima Tek, 318 F.3d at 1148. Reference to dictionaries and our cases indicates that the term "substantially" has numerous ordinary meanings. As the district court stated, "substantially" can mean "significantly" or "considerably." The term "substantially" can also mean "largely" or "essentially." Webster's New 20th Century Dictionary 1817 (1983).

Words of approximation, as contemplated in the foregoing, may also be used in phrases establishing approximate ranges or limits, where the end points are inclusive and approximate, not perfect; e.g., see AK Steel Corp. v. Sollac, 344 F.3d 1234, 68 USPQ2d 1280, 1285 (Fed. Cir. 2003) where it where the court said [W]e conclude that the ordinary meaning of the phrase "up to about 10%" includes the "about 10%" endpoint. As pointed out by AK Steel, when an object of the preposition "up to" is nonnumeric, the most natural meaning is to exclude the object (e.g., painting the wall up to the door). On the other hand, as pointed out by Sollac, when the object is a numerical limit, the normal meaning is to include that upper numerical limit (e.g., counting up to ten, seating capacity for up to seven passengers). Because we have here a numerical limit—"about 10%"—the ordinary meaning is that that endpoint is included.

In the present specification and claims, a goal of employment of such words of approximation, as contemplated in the foregoing, is to avoid a strict numerical boundary to the modified specified parameter, as sanctioned by Pall Corp. v. Micron Separations, Inc., 66 F.3d 1211, 1217, 36 USPQ2d 1225, 1229 (Fed. Cir. 1995) where it states "It is well established that when the term "substantially" serves reasonably to describe the subject matter so that its scope would be understood by persons in the field of the invention, and to distinguish the claimed subject matter from the prior art, it is not indefinite." Likewise see Verve LLC v. Crane Cams Inc., 311 F.3d 1116, 65 USPQ2d 1051, 1054 (Fed. Cir. 2002). Expressions such as "substantially" are used in patent documents when warranted by the nature of the invention, in order to accommodate the minor variations that may be appropriate to secure the invention. Such usage may well satisfy the charge to "particularly point out and distinctly claim" the invention, 35 U.S.C. § 112, and indeed may be necessary in order to provide the inventor with the benefit of his invention. In Andrew Corp. v. Gabriel Elecs. Inc., 847 F.2d 819, 821-22, 6 USPQ2d 2010, 2013 (Fed. Cir. 1988) the court explained that usages such as "substantially equal" and "closely approximate" may serve to describe the invention with precision appropriate to the technology and without intruding on the prior art. The court again explained in Ecolab Inc. v. Envirochem, Inc., 264 F.3d 1358, 1367, 60 USPQ2d 1173, 1179 (Fed. Cir. 2001) that "like the term 'about,' the term 'substantially' is a descriptive term commonly used in patent claims to 'avoid a strict numerical boundary to the specified parameter, see Ecolab Inc. v.

Envirochem Inc., 264 F.3d 1358, 60 USPQ2d 1173, 1179 (Fed. Cir. 2001) where the court found that the use of the term "substantially" to modify the term "uniform" does not render this phrase so unclear such that there is no means by which to ascertain the claim scope.

Similarly, other courts have noted that like the term "about," the term "substantially" is a descriptive term commonly used in patent claims to "avoid a strict numerical boundary to the specified parameter."; e.g., see Pall Corp. v. Micron Seps., 66 F.3d 1211, 1217, 36 USPQ2d 1225, 1229 (Fed. Cir. 1995); see, e.g., Andrew Corp. v. Gabriel Elecs. Inc., 847 F.2d 819, 821-22, 6 USPQ2d 2010, 2013 (Fed. Cir. 1988) (noting that terms such as "approach each other," "close to," "substantially equal," and "closely approximate" are ubiquitously used in patent claims and that such usages, when serving reasonably to describe the claimed subject matter to those of skill in the field of the invention, and to distinguish the claimed subject matter from the prior art, have been accepted in patent examination and upheld by the courts). In this case, "substantially" avoids the strict 100% nonuniformity boundary.

Indeed, the foregoing sanctioning of such words of approximation, as contemplated in the foregoing, has been established as early as 1939, see Ex parte Mallory, 52 USPQ 297, 297 (Pat. Off. Bd. App. 1941) where, for example, the court said "the claims specify that the film is "substantially" eliminated and for the intended purpose, it is believed that the slight portion of the film which may remain is negligible. We are of the view, therefore, that the claims may be regarded as sufficiently accurate." Similarly, In re Hutchison, 104 F.2d 829, 42 USPQ 90, 93 (C.C.P.A. 1939) the court said, "It is realized that "substantial distance" is a relative and somewhat indefinite term, or phrase, but terms and phrases of this character are not uncommon in patents in cases where, according to the art involved, the meaning can be determined with reasonable clearness."

Hence, for at least the forgoing reason, Applicants submit that it is improper for any examiner to hold as indefinite any claims of the present patent that employ any words of approximation.

Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar or equivalent to those described herein may be used in the practice or testing of the present invention. Structures described herein are to be understood also to refer to functional equivalents of such structures. The present invention will be described in detail below with reference to embodiments thereof as illustrated in the accompanying drawings.

References to a "device," an "apparatus," a "system," etc., in the preamble of a claim should be construed broadly to mean "any structure meeting the claim terms" exempt for any specific structure(s)/type(s) that has/(have) been explicitly disavowed or excluded or admitted/implied as prior art in the present specification or incapable of enabling an object/aspect/goal of the invention. Furthermore, where the present specification discloses an object, aspect, function, goal, result, or advantage of the invention that a specific prior art structure and/or method step is similarly capable of performing yet in a very different way, the present invention disclosure is intended to and shall also implicitly include and cover additional corresponding alternative embodiments that are otherwise identical to that explicitly disclosed except that they exclude such prior art structure(s)/step(s), and shall accordingly be deemed as providing sufficient disclosure to support a corresponding negative limitation in a claim claiming such alternative embodiment(s), which exclude such very different prior art structure(s)/step(s) way(s).

From reading the present disclosure, other variations and modifications will be apparent to persons skilled in the art. Such variations and modifications may involve equivalent and other features which are already known in the art, and which may be used instead of or in addition to features already described herein.

Although Claims have been formulated in this Application to particular combinations of features, it should be understood that the scope of the disclosure of the present invention also includes any novel feature or any novel combination of features disclosed herein either explicitly or implicitly or any generalization thereof, whether or not it relates to the same invention as presently claimed in any Claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The Applicants hereby give notice that new Claims may be formulated to such features and/or combinations of such features during the prosecution of the present Application or of any further Application derived therefrom.

References to "one embodiment," "an embodiment," "example embodiment," "various embodiments," "some embodiments," "embodiments of the invention," etc., may indicate that the embodiment(s) of the invention so described may include a particular feature, structure, or characteristic, but not every possible embodiment of the invention necessarily includes the particular feature, structure, or characteristic. Further, repeated use of the phrase "in one embodiment," or "in an exemplary embodiment," "an embodiment," do not necessarily refer to the same embodiment, although they may. Moreover, any use of phrases like "embodiments" in connection with "the invention" are never meant to characterize that all embodiments of the invention must include the particular feature, structure, or characteristic, and should instead be understood to mean "at least some embodiments of the invention" include the stated particular feature, structure, or characteristic.

References to "user", or any similar term, as used herein, may mean a human or non-human user thereof. Moreover, "user", or any similar term, as used herein, unless expressly stipulated otherwise, is contemplated to mean users at any stage of the usage process, to include, without limitation, direct user(s), intermediate user(s), indirect user(s), and end user(s). The meaning of "user", or any similar term, as used herein, should not be otherwise inferred, or induced by any pattern(s) of description, embodiments, examples, or referenced prior art that may (or may not) be provided in the present patent.

References to "end user", or any similar term, as used herein, is generally intended to mean late-stage user(s) as opposed to early-stage user(s). Hence, it is contemplated that there may be a multiplicity of different types of "end user" near the end stage of the usage process. Where applicable, especially with respect to distribution channels of embodiments of the invention comprising consumed retail products/services thereof (as opposed to sellers/vendors or Original Equipment Manufacturers), examples of an "end user" may include, without limitation, a "consumer", "buyer", "customer", "purchaser", "shopper", "enjoyer", "viewer", or individual person or non-human thing benefiting in any way, directly or indirectly, from use of. or interaction, with some aspect of the present invention.

In some situations, some embodiments of the present invention may provide beneficial usage to more than one stage or type of usage in the foregoing usage process. In such cases where multiple embodiments targeting various stages of the usage process are described, references to "end user", or any similar term, as used therein, are generally intended to not include the user that is the furthest removed, in the foregoing usage process, from the final user therein of an embodiment of the present invention.

Where applicable, especially with respect to retail distribution channels of embodiments of the invention, intermediate user(s) may include, without limitation, any individual person or non-human thing benefiting in any way, directly or indirectly, from use of, or interaction with, some aspect of the present invention with respect to selling, vending, Original Equipment Manufacturing, marketing, merchandising, distributing, service providing, and the like thereof.

References to "person", "individual", "human", "a party", "animal", "creature", or any similar term, as used herein, even if the context or particular embodiment implies living user, maker, or participant, it should be understood that such characterizations are sole by way of example, and not limitation, in that it is contemplated that any such usage, making, or participation by a living entity in connection with making, using, and/or participating, in any way, with embodiments of the present invention may be substituted by such similar performed by a suitably configured non-living entity, to include, without limitation, automated machines, robots, humanoids, computational systems, information processing systems, artificially intelligent systems, and the like. It is further contemplated that those skilled in the art will readily recognize the practical situations where such living makers, users, and/or participants with embodiments of the present invention may be in whole, or in part, replaced with such non-living makers, users, and/or participants with embodiments of the present invention. Likewise, when those skilled in the art identify such practical situations where such living makers, users, and/or participants with embodiments of the present invention may be in whole, or in part, replaced with such non-living makers, it will be readily apparent in light of the teachings of the present invention how to adapt the described embodiments to be suitable for such non-living makers, users, and/or participants with embodiments of the present invention. Thus, the invention is thus to also cover all such modifications, equivalents, and alternatives falling within the spirit and scope of such adaptations and modifications, at least in part, for such non-living entities.

Headings provided herein are for convenience and are not to be taken as limiting the disclosure in any way.

The enumerated listing of items does not imply that any or all of the items are mutually exclusive, unless expressly specified otherwise.

It is understood that the use of specific component, device and/or parameter names are for example only and not meant to imply any limitations on the invention. The invention may thus be implemented with different nomenclature/terminology utilized to describe the mechanisms/units/structures/components/devices/parameters herein, without limitation. Each term utilized herein is to be given its broadest interpretation given the context in which that term is utilized.

Terminology. The following paragraphs provide definitions and/or context for terms found in this disclosure (including the appended claims):

"Comprising" And "contain" and variations of them—Such terms are open-ended and mean "including but not limited to". When employed in the appended claims, this term does not foreclose additional structure or steps. Consider a claim that recites: "A memory controller comprising a system cache . . . " Such a claim does not foreclose the memory controller from including additional components (e.g., a memory channel unit, a switch).

"Configured To." Various units, circuits, or other components may be described or claimed as "configured to" perform a task or tasks. In such contexts, "configured to" or "operable for" is used to connote structure by indicating that the mechanisms/units/circuits/components include structure (e.g., circuitry and/or mechanisms) that performs the task or tasks during operation. As such, the mechanisms/unit/circuit/component can be said to be configured to (or be operable) for perform(ing) the task even when the specified mechanisms/unit/circuit/component is not currently operational (e.g., is not on). The mechanisms/units/circuits/components used with the "configured to" or "operable for" language include hardware—for example, mechanisms, structures, electronics, circuits, memory storing program instructions executable to implement the operation, etc. Reciting that a mechanism/unit/circuit/component is "configured to" or "operable for" perform(ing) one or more tasks is expressly intended not to invoke 35 U.S.C. . . . sctn. 112, sixth paragraph, for that mechanism/unit/circuit/component. "Configured to" may also include adapting a manufacturing process to fabricate devices or components that are adapted to implement or perform one or more tasks.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The terms "a", "an" and "the" mean "one or more", unless expressly specified otherwise.

All terms of exemplary language (e.g., including, without limitation, "such as", "like", "for example", "for instance", "similar to", etc.) are not exclusive of any other, potentially, unrelated, types of examples; thus, implicitly mean "by way of example, and not limitation . . . ", unless expressly specified otherwise.

Unless otherwise indicated, all numbers expressing conditions, concentrations, dimensions, and so forth used in the specification and claims are to be understood as being modified in all instances by the term "about." Accordingly, unless indicated to the contrary, the numerical parameters set forth in the following specification and attached claims are approximations that may vary depending at least upon a specific analytical technique.

The term "comprising," which is synonymous with "including," "containing," or "characterized by" is inclusive or open-ended and does not exclude additional, unrecited elements or method steps. "Comprising" is a term of art used in claim language which means that the named claim elements are essential, but other claim elements may be added and still form a construct within the scope of the claim.

As used herein, the phase "consisting of" excludes any element, step, or ingredient not specified in the claim. When the phrase "consists of" (or variations thereof) appears in a clause of the body of a claim, rather than immediately following the preamble, it limits only the element set forth in that clause; other elements are not excluded from the claim as a whole. As used herein, the phase "consisting essentially of" and "consisting of" limits the scope of a claim to the specified elements or method steps, plus those that do not materially affect the basis and novel characteristic(s) of the claimed subject matter (see Norian Corp. v Stryker Corp., 363 F.3d 1321, 1331-32, 70 USPQ2d 1508, Fed. Cir. 2004). Moreover, for any claim of the present invention which claims an embodiment "consisting essentially of" or "consisting of" a certain set of elements of any herein described embodiment it shall be understood as obvious by those skilled in the art that the present invention also covers all possible varying scope variants of any described embodiment(s) that are each exclusively (i.e., "consisting essentially of") functional subsets or functional combination thereof such that each of these plurality of exclusive varying scope variants each consists essentially of any functional subset(s) and/or functional combination(s) of any set of elements of any described embodiment(s) to the exclusion of any others not set forth therein. That is, it is contemplated that it will be obvious to those skilled how to create a multiplicity of alternate embodiments of the present invention that simply consisting essentially of a certain functional combination of elements of any described embodiment(s) to the exclusion of any others not set forth therein, and the invention thus covers all such exclusive embodiments as if they were each described herein.

With respect to the terms "comprising," "consisting of," and "consisting essentially of," where one of these three terms is used herein, the disclosed and claimed subject matter may include the use of either of the other two terms. Thus, in some embodiments not otherwise explicitly recited, any instance of "comprising" may be replaced by "consisting of" or, alternatively, by "consisting essentially of", and thus, for the purposes of claim support and construction for "consisting of" format claims, such replacements operate to create yet other alternative embodiments "consisting essentially of" only the elements recited in the original "comprising" embodiment to the exclusion of all other elements.

Moreover, any claim limitation phrased in functional limitation terms covered by 35 USC § 112(6) (post AIA 112(f)) which has a preamble invoking the closed terms "consisting of," or "consisting essentially of," should be understood to mean that the corresponding structure(s) disclosed herein define the exact metes and bounds of what the so claimed invention embodiment(s) consists of, or consisting essentially of, to the exclusion of any other elements which do not materially affect the intended purpose of the so claimed embodiment(s). Furthermore, any statement(s), identification(s), or reference(s) to a structure(s) and/or element(s) that corresponds to and/or supports a claim limitation(s) phrased in functional limitation terms covered by 35 USC § 112(6) (post AIA 112(f) should be understood to be identified by way of example and not limitation, and as such, should not be interpreted to mean that such recited structure and/or element is/are the only structure(s) and/or element(s) disclosed in this patent application that corresponds to and/or supports such claim limitations phrased in functional limitation terms. This claims interpretation intention also applies to any such subsequent statements made by Applicant during prosecution.

Devices or system modules that are in at least general communication with each other need not be in continuous communication with each other, unless expressly specified otherwise. In addition, devices or system modules that are in at least general communication with each other may communicate directly or indirectly through one or more intermediaries. Moreover, it is understood that any system components described or named in any embodiment or claimed herein may be grouped or sub-grouped (and accordingly implicitly renamed) in any combination or sub-combination as those skilled in the art can imagine as suitable for the particular application, and still be within the scope and spirit of the claimed embodiments of the present invention. For an example of what this means, if the invention was a controller of a motor and a valve and the embodiments and claims articulated those components as being separately grouped and connected, applying the foregoing would mean that such an invention and claims would also implicitly cover the valve being grouped inside the motor and the controller being a remote controller with no direct physical connection to the motor or internalized valve, as such the claimed invention is contemplated to cover all ways of grouping and/or adding of intermediate components or systems that still substantially achieve the intended result of the invention.

A description of an embodiment with several components in communication with each other does not imply that all such components are required. On the contrary a variety of optional components are described to illustrate the wide variety of possible embodiments of the present invention.

As is well known to those skilled in the art many careful considerations and compromises typically must be made when designing for the optimal manufacture of a commercial implementation any system, and in particular, the embodiments of the present invention. A commercial implementation in accordance with the spirit and teachings of the present invention may configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

Some preferred embodiments of the present invention describe locking systems referred to as the Skiles Locking System, S.L.S. The Skiles Locking System, S.L.S. may incorporate an existing Kwikset tubular locking cylinder in its operation (FIG. 1). The S.L.S. Locking System utilizes multiple internal spring-loaded sliding bolts and also multiple internal spring-loaded floating locks within the spring-loaded sliding bolts. Rotating discs, which are attached to the Kwikset tubular locking cylinder, operate independently of each other yet are located on the same Kwikset tubular locking cylinder.

In the S.L.S. Locking System, rotating the doorknob (FIG. 1) is not necessary to activate the locking system as is required in other known locking systems. This feature of the S.L.S. Locking System may enable multiple internal spring-loaded bolts (FIGS. 2 & 3) within the door (FIGS. 3 & 5) to be activated immediately and simultaneously after closure of the door (FIG. 5) creating a safe, secure, and defended position for the occupants without having to activate additional locks, dead bolts or keyed mechanisms in the door, saving precious seconds and possibly lives in the process.

An embodiment of the present invention may provide a mechanized system of multiple internal spring-loaded sliding bolts and internal spring-loaded floating lock mechanisms located inside of the door. The S.L.S. Skiles Locking System protects the occupants and their property from unwanted intruders, harm, and theft. These internal spring-loaded sliding bolts and their internally located spring-loaded floating locks are interconnected with and to a centrally positioned doorknob mechanism and to the S.L.S. rotating discs which allow activation of the locking system mechanism either inside or outside the dwelling into the locked or unlocked position. The S.L.S. Skiles Locking System is also activated inside or outside of the dwelling with either a key, button (inside) or electronic keyless entry device, allowing the door to be unlocked and opened. This can be done from either side of the door, (inside or outside) unlike in certain current locking system, which allows operation only from the inside. The same simultaneous movement and action in the S.L.S. Locking System is accomplished (FIG. 2) with all multiple internal spring-loaded lock mechanisms.

Figure 10:
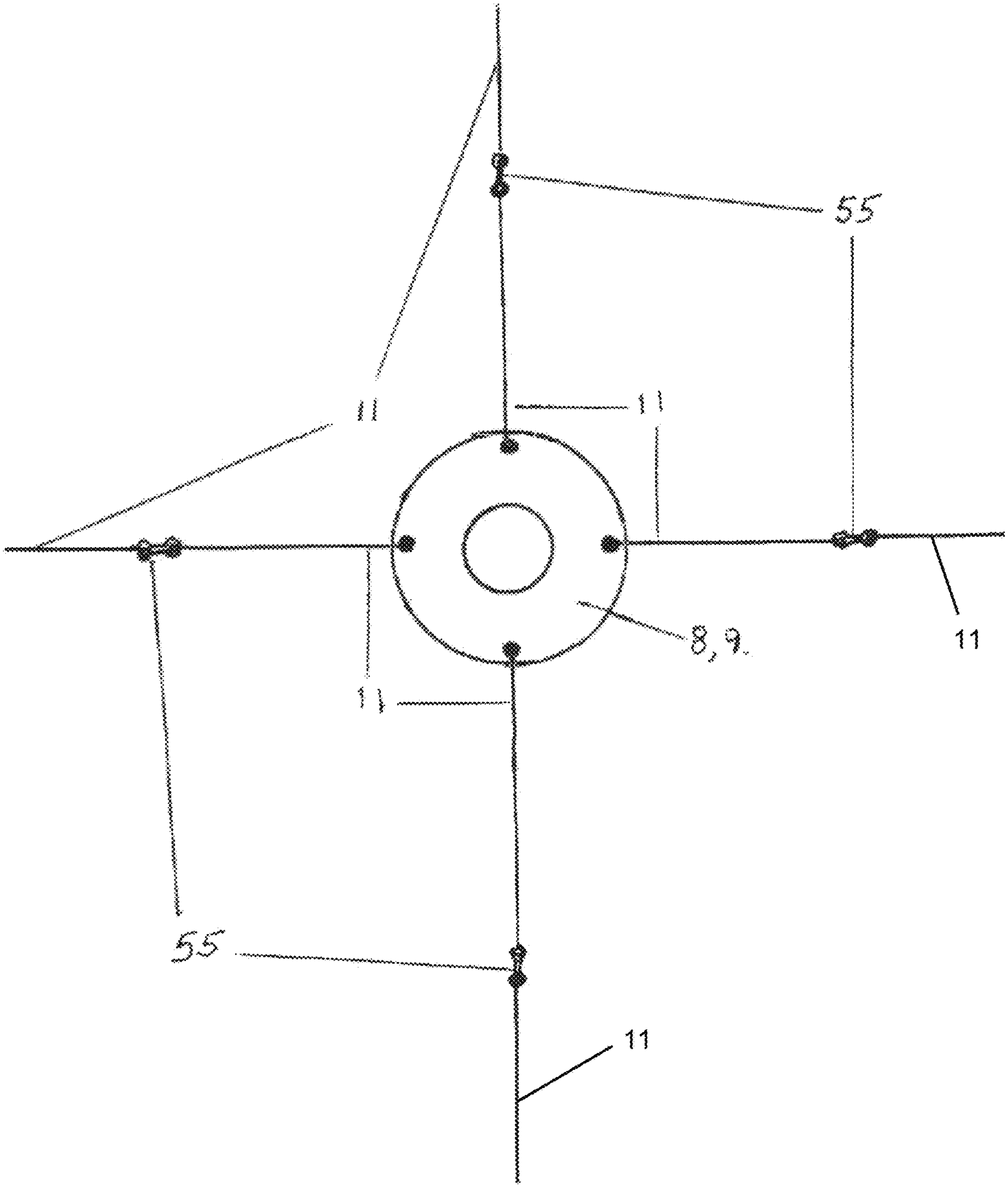
FIG. 10—S. L S. Rotating Disc (8, 9) "Weak-link" connectors unbroken FIG. 11—S.L.S. Internal locking system bolt mechanism (Locked position within door frame.)
Figure 11:
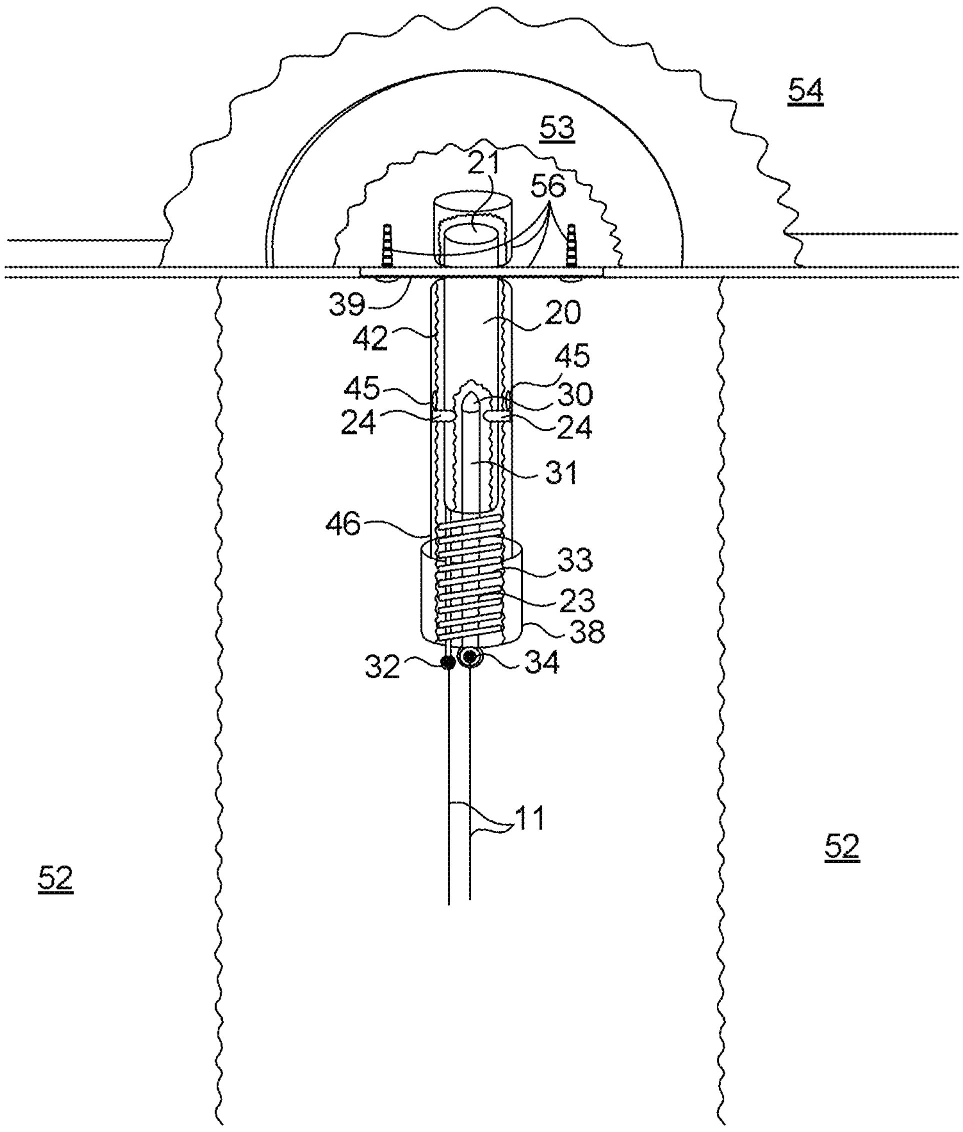

When the doorknob is compromised (FIG. 9) the S.L.S. mechanisms (FIG. 10) will remain locked in place (FIG. 11). The wire connectors between the internal spring-loaded bolt locks and the S.L.S. doorknob mechanism (FIG. 9) will be broken by force. The steel connecting wires once separated from the S.L.S. doorknob mechanism and their respective internal spring-loaded bolt locks cannot be reattached. The locked position of the S.L.S. mechanism (FIG. 11) cannot be unlocked manually because the connecting wires (FIG. 9) are unreachable by the intruder.

Figure 9:
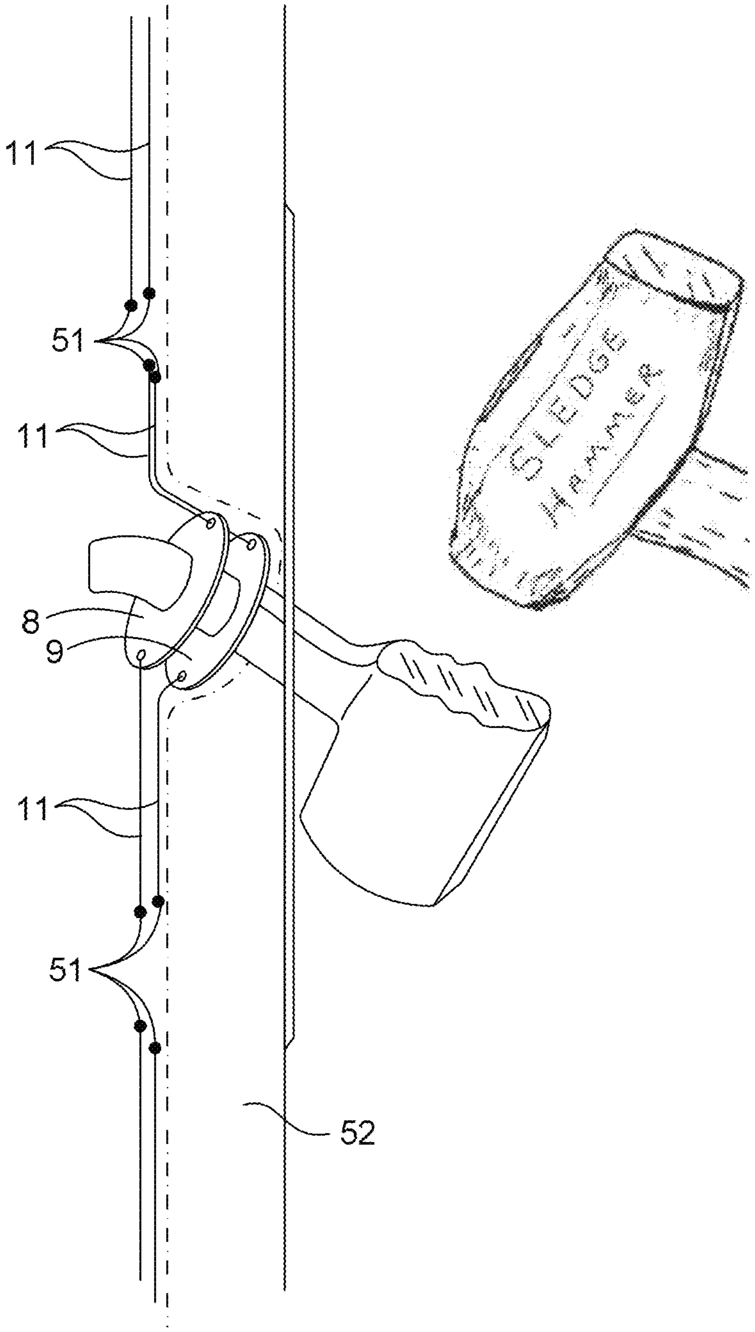
FIG. 9—S.L.S. Doorknob Mechanism (Compromised)

When the doorknob is compromised by force, (FIG. 9) adverse pressure is applied to the mechanism and its connections. An incorporated "weak-link" (FIG. 9) is built into the connecting wires. (FIG. 10) This part (FIG. 10) is made from a softer and weaker metal (brass) as compared to the (steel) connecting wires (FIG. 10) which connect the S.L.S. internal spring-loaded bolt locks to the S.L.S. doorknob mechanism. (FIG. 9) When compromising force is applied to the S.L.S. doorknob mechanism, (FIG. 9) the connecting wires (FIG. 9) will separate at the "weak-link" (FIG. 9) and disconnect the attachment to the S.L.S. internal spring-loaded bolt locks (FIG. 10) and the S.L.S. doorknob mechanism (FIG. 9). When this separation occurs, the internal spring-loaded bolt locks (FIG. 11) will remain in the locked position (FIG. 11) by way of the internal springs within the bolt mechanism, (FIG. 11) providing continued force upon their respective bolt locks within the mechanism. (FIG. 11). This locked position of the door within its frame (FIG. 11) cannot be reversed manually or otherwise because of the disconnection of the two mechanisms (FIG. 9) within the system and door.

1. Internal spring-loaded bolt locks are simultaneously activated by a key, button or remote electronic device.
2. When the doorknob mechanism is compromised, (FIG. 9) the internal locking mechanisms will remain locked in place.
3. The S.L.S. locking mechanism with the internal spring-loaded bolt locks are completely contained within a brass cylinder within the door.

It is contemplated that another application of embodiments comprising locking systems with spring loaded bolt locks and a central locking/release knob may be for use in window and glass door installations in homes, businesses, schools, marine craft, etc. In such applications the system may be configured to utilize a steel window frame, high impact glass, and a secured stainless-steel screen along with a locking system according to an embodiment of the present invention. It is believed that this window and glass door application may provide further security in homes, businesses, schools, and marine craft and for the occupants and property therein by helping to deter unwanted intruders when these devices are properly installed.

Figure 14:
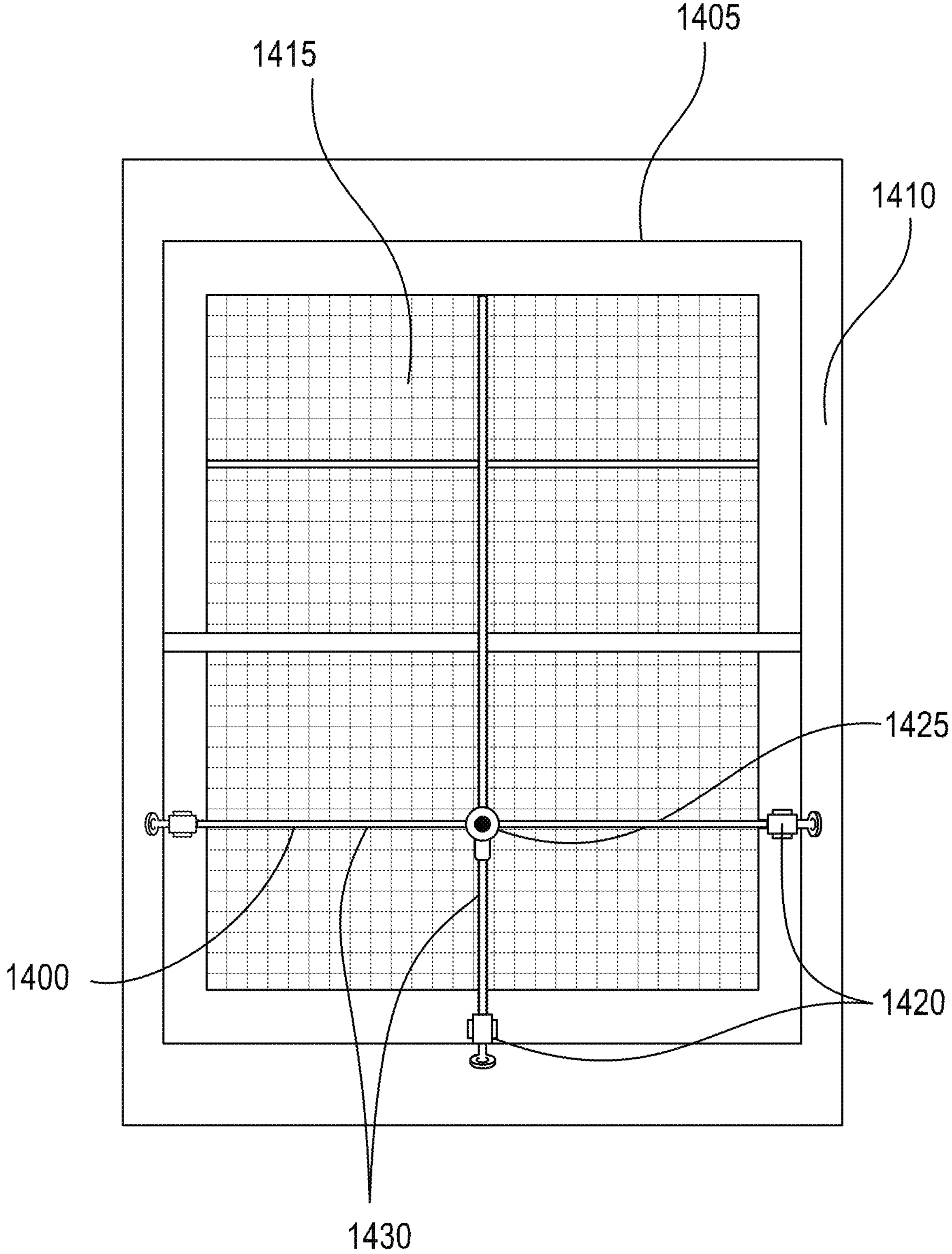
FIG. 14 illustrates an exemplary locking system installed on a window, in accordance with an embodiment of the present invention.

FIG. 14 illustrates an exemplary locking system 1400 installed on a barrier implement such as, but not limited to window 1405, in accordance with an embodiment of the present invention. In the present embodiment, locking system 1400 may be installed in and on a steel window frame 1410 and the glass of window 1405. This window system utilizes a steel window frame 1410, high impact glass, and a secured fine mesh, stainless-steel screen 1415. The fine mesh screen 1415 can be easily seen through to the outside like typical house window screen presently used. It is contemplated that alternate embodiments may utilize different materials for the various components. For example, without limitation, the window frame may be made of wood or other types of metal; the window may be made of other types of glass or various plastic materials; finally, the screen may be made of different types of metal or plastic. It is further contemplated that some embodiments may be implemented without a screen component. In the present embodiment, internally spring-loaded bolt locks 1420 may be secured on window frame 1410, one on each side horizontally opposing each other and another secured on the bottom portion of window frame 1410. A bolt lock is not shown at the top of window frame 1410 in the present embodiment because the top half of window 1405 is permanently fixed in the construction process and is non-movable. It is contemplated that alternate embodiments may be implemented with a multiplicity of suitable bolt lock configurations to suit various different arrangements of moving and non-moving portions of a window. In the present embodiment, internally spring-loaded bolt locks 1420 are interconnected to a central locking/release knob 1425 positioned near the center of the lower portion of window 1405, which is movable. Central locking/release knob 1425 may be connected to all internally spring-loaded bolt locks 1420 with "weak-link" cables or rods 1430 similar to the "weak-link" cables and rods described in reference to embodiments described above and may be used to operate bolt locks 1420 by moving bolt locks 1420 between a locked position and a released or unlocked position. In alternate embodiment the central locking/releasing mechanism may be configured as a lever, other types of handles, a key, a push button release, etc. Some embodiments may be configured for use with an electronic device for locking and unlocking the system such as, but not limited to, a smart lock device comprising features such as, but not limited to, physical key a, keypad and PIN function, biometric locking functions, activation cards, Bluetooth®/Wi-Fi capabilities for cell phone usable features, etc.

In typical use of the present embodiment, this application is installed on the interior side (inside of structure) of window 1405. Window 1405 automatically locks when pushed down and closed as the internal springs in spring-loaded bolt locks 1420 push bolt locks 1420 into their respective alignment slots in or on window frame 1410. When opening window 1405, central locking/release knob 1425 may be turned counter-clockwise to release bolt locks 1420 by pulling in the weak link cables to move bolt locks 1420 out of their respective slots in or on window frame 1410. This frees the bottom portion of window 1405 allowing it to be raised and opened.

Figure 15:
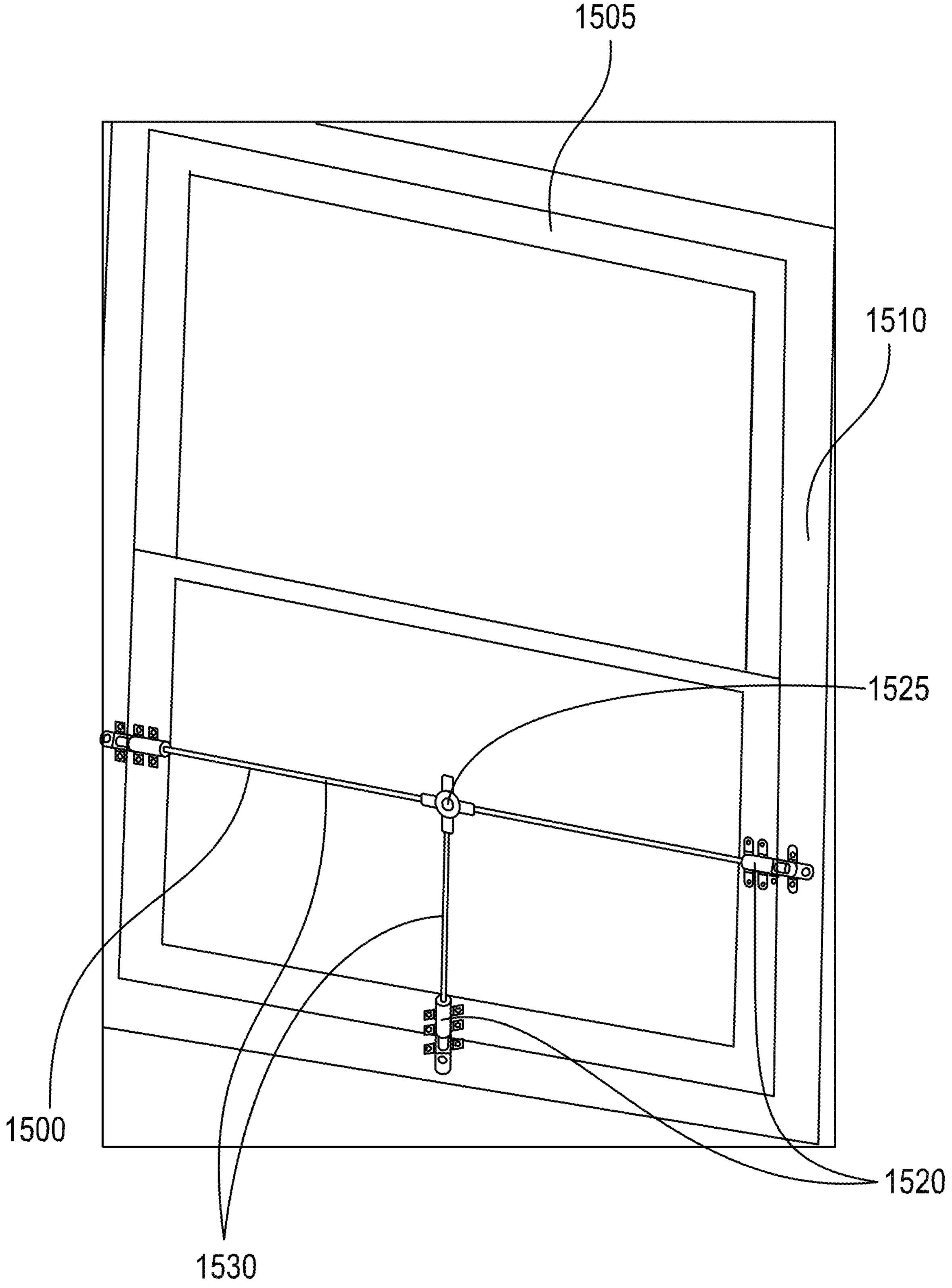
FIG. 15 illustrates an exemplary locking system installed on a window, in accordance with an embodiment of the present invention.

FIG. 15 illustrates an exemplary locking system installed on a window 1505, in accordance with an embodiment of the present invention. In the present embodiment, locking system 1500 may be installed in and on a wood or steel window frame 1510 and the glass of window 1505. Internally spring-loaded bolt locks 1520 may be secured on window 1505 and frame 1510, one on each side horizontally opposing each other and another secured on the bottom and top portion of window 1505 and frame 1510. Internally spring-loaded bolt locks 1520 are interconnected to a central locking/release knob 1525 positioned near the center of window 1405 with "weak-link" cables or rods 1530. This embodiment is similar to the embodiment shown by way of example in FIG. 14 and is included to illustrate exemplary attachment means for mounting the locking system to the window. Those skilled in the art, in light of the teachings of the present invention, will readily recognize that various different types of attachment mean may be used to mount the locking system to the window.

Figure 16:
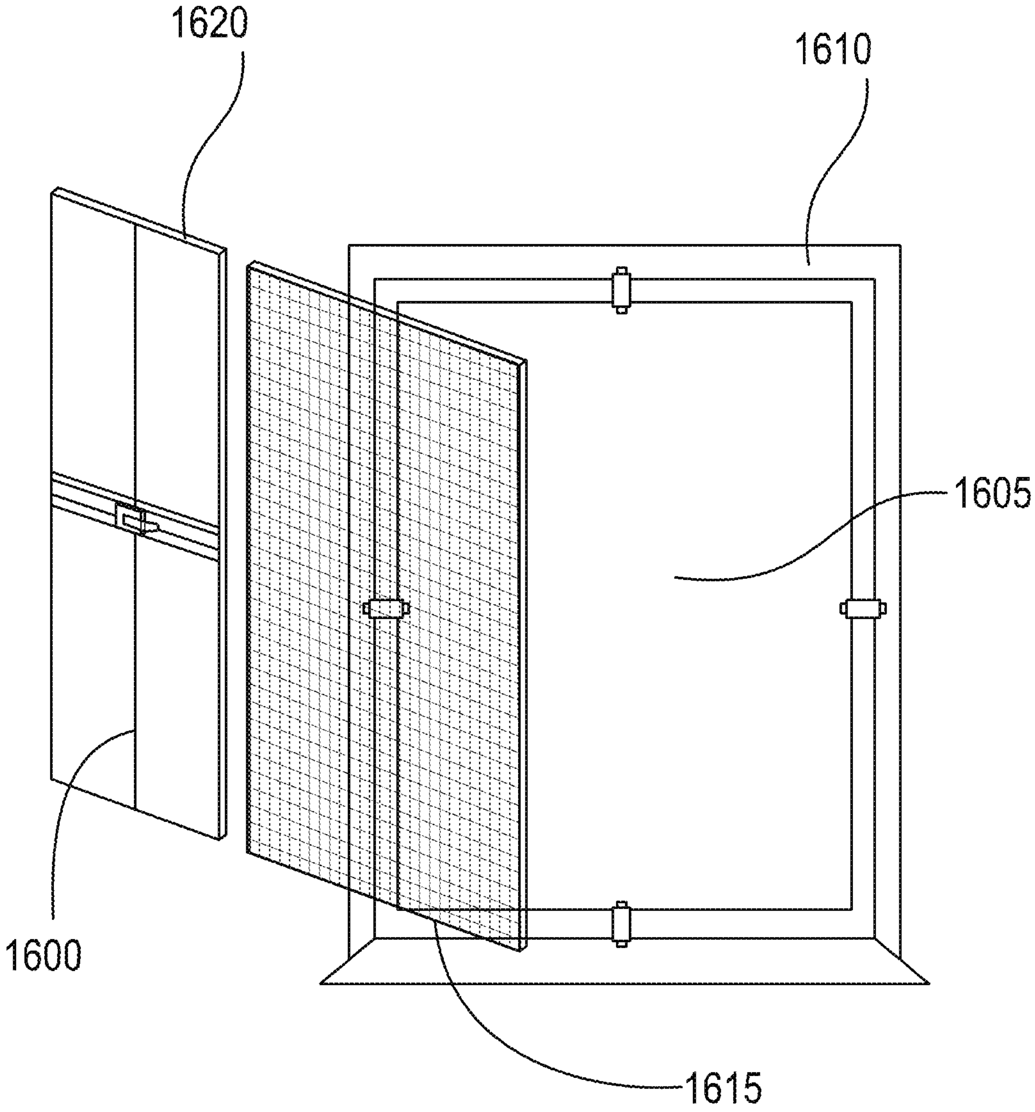
FIG. 16 is an exploded view of an exemplary layered window structure that may be used with a locking system 1600, in accordance with an embodiment of the present invention.

FIG. 16 is an exploded view of an exemplary layered window structure that may be used with a locking system 1600, in accordance with an embodiment of the present invention. In the present embodiment, the window may comprise an external sheet of high impact glass 1605 secured in place in a window frame 1610. Then, a mesh screen 1615 is laid onto external sheet of glass 1605 and is covered evenly with a clear non-yellowing epoxy film (not shown). An internal sheet of high impact glass 1620 is then placed upon screen 1615 and external glass sheet 1605 and clear epoxy. It is believed that this combined three-layered lamination process may help to create a strong wall of defense against unwanted intruders. Screen 1615 is preferably a fine weave, stainless steel screen. However, different types of screens may be used in some embodiments. Yet other embodiments may be implemented without a screen. It is further contemplated that different types of materials and layers could be used in alternate embodiments such as, but not limited to steel or wooden window frames, different types of glass, etc. For example, without limitation, some embodiments could be implemented without an epoxy layer on the glass. Some embodiments may be implemented with other types of features layered into the window structure including, without limitation, alarm sensors, a layer of glass that can change from transparent to opaque, etc. In yet other embodiments the locking system itself could be placed between the layers of the glass. Such embodiments may be operated by a locking/releasing mechanism connected on the outside of the window that is connected to the locking system. Alternately, locking systems placed between the layers of glass may be electronically enabled to be operated by an external electronic device such as, but not limited to, a keypad or a cell phone.

Figure 17:
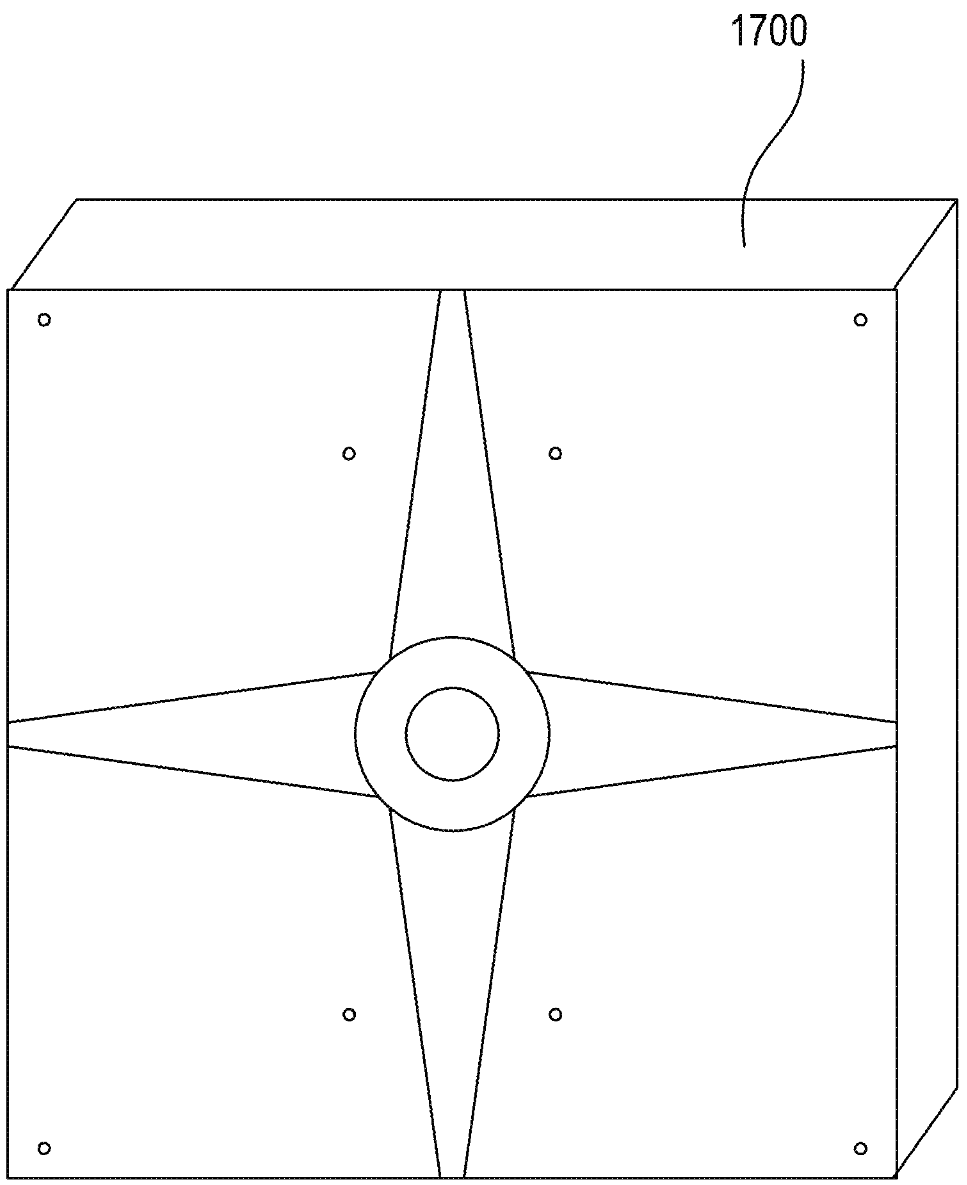
FIG. 17 illustrates an exemplary "kit" form package that may be utilized to install a locking system on new and existing doors, in accordance with an embodiment of the present invention.

FIG. 17 illustrates an exemplary "kit" form package that may be utilized to install a locking system on barrier implements such as but not limited to new and existing doors, in accordance with an embodiment of the present invention. In the present embodiment, this package comprises an installation block 1700 that may enable a locking system with a 5-Function door locking handle, for example, without limitation, an embodiment similar to the Skiles Locking System. S.L.S. door system illustrated in FIGS. 1-13, to be installed on the interior surface of a new or existing door. The components of the 5-Function door locking handle may be attached to block 1700 rather than being installed on or in the door itself. In the present embodiment block 1700 comprises a hole 1705 in the center for the 5-Function door locking handle and a round recessed area 1710 for the rotating disc apparatus. Recessed channels 1715 may extend from recessed area 1710 to the edges of block 1700 through which "weak-link" cable apparatuses may extend from the 5-Function door locking handle to spring-loaded locks installed on the door frame. Channels 1715 provide space to enable the "weak link" cable apparatuses to move during the operation of the locking system. The embodiment shown comprises four channels 1715 to allow spring-loaded locks to be installed on both sides of the door frame as well as in the top and bottom of the door frame if desired. Holes 1720 may be configured as attachment holes. Once the door locking handle along with accompanying spring-loaded locks, attaching cables, and "weak link" cables apparatuses are attached to block 1700, block 1700 may then be installed on a door. Holes 1725 may be pre-drilled into block 1700 that may be configured to accept attachment means such as, but not limited to, bolts for installing block 1700 onto a door. The face of block 1700 shown in the drawing is the "hidden" side that would be attached to the interior face of the door.

It is contemplated that block 1700 may be implemented as a less costly version of the internal Skiles Locking System. S.L.S. door system described in the foregoing and may avail itself to a larger customer base. It is contemplated that the Kwikset tubular Knob/lock set described in some previous embodiments of the Skiles Locking System. S.L.S. door system may be replaced with a smart lock device with various locking features including without limitation, a key, a combination lock function, a fingerprint function, an activation card, and Bluetooth®/Wi-Fi cell phone usable features. An example of such a device is the "AiBOCN"® Smart Door Lock unit.

Those skilled in the art will readily recognize, in light of and in accordance with the teachings of the present invention, that any of the foregoing steps may be suitably replaced, reordered, removed and additional steps may be inserted depending upon the needs of the particular application. Moreover, the prescribed method steps of the foregoing embodiments may be implemented using any physical and/or hardware system that those skilled in the art will readily know is suitable in light of the foregoing teachings.

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

It is noted that according to USA law 35 USC § 112(1), all claims must be supported by sufficient disclosure in the present patent specification, and any material known to those skilled in the art need not be explicitly disclosed. However, 35 USC § 112(6) requires that structures corresponding to functional limitations interpreted under 35 USC § 112(6) must be explicitly disclosed in the patent specification. Moreover, the USPTO's Examination policy of initially treating and searching prior art under the broadest interpretation of a "mean for" or "steps for" claim limitation implies that the broadest initial search on 35 USC § 112(6) (post AIA 112(f)) functional limitation would have to be conducted to support a legally valid Examination on that USPTO policy for broadest interpretation of "mean for" claims. Accordingly, the USPTO will have discovered a multiplicity of prior art documents including disclosure of specific structures and elements which are suitable to act as corresponding structures to satisfy all functional limitations in the below claims that are interpreted under 35 USC § 112(6) (post AIA 112(f)) when such corresponding structures are not explicitly disclosed in the foregoing patent specification. Therefore, for any invention element(s)/structure(s) corresponding to functional claim limitation(s), in the below claims interpreted under 35 USC § 112(6) (post AIA 112(f)), which is/are not explicitly disclosed in the foregoing patent specification, yet do exist in the patent and/or non-patent documents found during the course of USPTO searching, Applicant(s) incorporate all such functionally corresponding structures and related enabling material herein by reference for the purpose of providing explicit structures that implement the functional means claimed. Applicant(s) request(s) that fact finders during any claims construction proceedings and/or examination of patent allowability properly identify and incorporate only the portions of each of these documents discovered during the broadest interpretation search of 35 USC § 112(6) (post AIA 112(f)) limitation, which exist in at least one of the patent and/or non-patent documents found during the course of normal USPTO searching and or supplied to the USPTO during prosecution. Applicant(s) also incorporate by reference the bibliographic citation information to identify all such documents comprising functionally corresponding structures and related enabling material as listed in any PTO Form-892 or likewise any information disclosure statements (IDS) entered into the present patent application by the USPTO or Applicant(s) or any 3rd parties. Applicant(s) also reserve its right to later amend the present application to explicitly include citations to such documents and/or explicitly include the functionally corresponding structures which were incorporate by reference above.

Thus, for any invention element(s)/structure(s) corresponding to functional claim limitation(s), in the below claims, that are interpreted under 35 USC § 112(6) (post AIA 112(f)), which is/are not explicitly disclosed in the foregoing patent specification, Applicant(s) have explicitly prescribed which documents and material to include the otherwise missing disclosure, and have prescribed exactly which portions of such patent and/or non-patent documents should be incorporated by such reference for the purpose of satisfying the disclosure requirements of 35 USC § 112(6). Applicant(s) note that all the identified documents above which are incorporated by reference to satisfy 35 USC § 112(6) necessarily have a filing and/or publication date prior to that of the instant application, and thus are valid prior documents to incorporated by reference in the instant application.

Having fully described at least one embodiment of the present invention, other equivalent or alternative methods of implementing according to the present invention will be apparent to those skilled in the art. Various aspects of the invention have been described above by way of illustration, and the specific embodiments disclosed are not intended to limit the invention to the particular forms disclosed. The particular implementation of the may vary depending upon the particular context or application. By way of example, and not limitation, the implementations; however, similar techniques may instead be applied to, which implementations of the present invention are contemplated as within the scope of the present invention. The invention is thus to cover all modifications, equivalents, and alternatives falling within the spirit and scope of the following claims. It is to be further understood that not all of the disclosed embodiments in the foregoing specification will necessarily satisfy or achieve each of the objects, advantages, or improvements described in the foregoing specification.

Claim elements and steps herein may have been numbered and/or lettered solely as an aid in readability and understanding. Any such numbering and lettering in itself is not intended to and should not be taken to indicate the ordering of elements and/or steps in the claims.

The corresponding structures, materials, acts, and equivalents of all means or step plus function elements in the claims below are intended to include any structure, material, or act for performing the function in combination with other claimed elements as specifically claimed.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The Abstract is provided to comply with 37 C.F.R. Section 1.72(b) requiring an abstract that will allow the reader to ascertain the nature and gist of the technical disclosure. That is, the Abstract is provided merely to introduce certain concepts and not to identify any key or essential features of the claimed subject matter. It is submitted with the understanding that it will not be used to limit or interpret the scope or meaning of the claims.

The following claims are hereby incorporated into the detailed description, with each claim standing on its own as a separate embodiment.

Only those claims which employ the words "means for" or "steps for" are to be interpreted under 35 USC 112, sixth paragraph (pre-AIA) or 35 USC 112(f) post-AIA. Otherwise, no limitations from the specification are to be read into any claims, unless those limitations are expressly included in the claims.

What is claimed is:

1. A system comprising:

a barrier implement;

a barrier implement frame, wherein said barrier implement frame is configured to engage said barrier implement;

a bolt lock implement, wherein said bolt lock implement is configured to secure said barrier implement to said barrier implement frame in a lock position;

a knob implement, wherein said bolt lock implement is configured to remain in the lock position when said knob implement is being compromised or broken by force;

a floating lock separator pinion connecting rod, wherein said floating lock separator pinion connecting rod is a first connecting rod configured to interconnect said knob implement and said bolt lock;

a spring-loaded sliding bolt connecting rod, wherein said spring-loaded sliding bolt connecting rod is a second connecting rod configured to interconnect said knob implement and said bolt lock;

wherein said spring-loaded sliding bolt connecting rod and said floating lock separator pinion connecting rod combine to form a bolt lock releasing mechanism, wherein said bolt lock releasing mechanism is configured to be operable to release said bolt lock into an unlocked position;

a floating lock separator pinion connecting wire, said floating lock separator pinion connecting wire is configured to engage said floating lock separator pinion connecting rod to interconnect said knob implement and bolt lock;

a spring-loaded sliding bolt connecting wire, said spring-loaded sliding bolt connecting wire is configured to engage said spring-loaded sliding bolt connecting rod to interconnect said knob implement and bolt lock;

a floating lock separator pinion connecting wire weak-link, wherein said floating lock separator pinion connecting wire weak-link is configured with said floating lock separator pinion connecting wire, wherein said floating lock separator pinion connecting wire weak-link is configured to break and separate said floating lock separator pinion connecting wire when said knob implement is being compromised or broken by force;

a spring-loaded sliding bolt connecting wire weak-link, wherein said spring-loaded sliding bolt connecting wire weak-link is configured with said spring-loaded sliding bolt connecting wire, wherein said spring-loaded sliding bolt connecting wire weak-link is configured to break and separate said spring-loaded sliding bolt connecting wire when said knob implement is being compromised or broken by force; and wherein said knob implement is configured to release said bolt lock by pulling in said bolt lock releasing mechanism to move said bolt lock out of the lock position.

2. The system of claim 1, wherein said bolt lock implement comprises at least three bolt locks, said three bolt locks are configured to secure said barrier implement to said barrier implement frame, wherein said barrier implement comprises a window implement and said barrier implement frame comprises a window frame.

3. The system of claim 1, wherein said bolt lock comprises an internal spring, and wherein said barrier implement comprises a window and said barrier implement frame comprises a window frame.

4. The system of claim 1, wherein said bolt lock implement comprises at least three spring-loaded bolt locks that is configured to secure said barrier implement frame to said barrier implement in said lock position.

5. The system of claim 1, wherein said bolt lock implement comprises two or more spring-loaded bolt locks interconnected to said knob implement, wherein said two or more spring-loaded bolt locks is configured to secure said barrier implement frame to said barrier implement in said lock position.

6. The system of claim 1, wherein said bolt lock implement is configured to be operable as a window locking system, whereby said bolt lock implement comprises at least three spring-loaded bolt locks, knob implement, said floating lock separator pinion connecting rod, and said spring-loaded sliding bolt connecting rod.

7. The system of claim 6, wherein said window locking system is configured to be electronically operated by an external electronic device.

8. The system of claim 7, wherein said window locking system is configured to be operable with a keypad or a cell phone.

9. The system of claim 1, wherein said barrier implement comprises at least a window implement, and wherein said knob implement is a centrally located window knob implement.

10. The system of claim 9, wherein said barrier implement frame comprises a steel window frame.

11. The system of claim 9, wherein said window implement comprises a layered window structure with said centrally located window knob implement.

12. The system of claim 11, wherein said layered window structure comprises a high impact glass.

13. The system of claim 12, wherein said high impact glass comprises a first high impact glass engaged with said window frame.

14. The system of claim 13, wherein said layered window structure comprises a mesh screen laid upon said first high impact glass.

15. The system of claim 14, wherein said mesh screen comprises a fine mesh stainless-steel screen.

16. The system of claim 15, wherein said layered window structure further comprises a clear non-yellowing epoxy film cover.

17. The system of claim 16, wherein said layered window structure further comprises a second high impact glass.

18. The system of claim 17, wherein said first impact glass and second impact glass are engaged with clear epoxy.

19. A system consisting of:

a barrier implement, wherein said barrier implement comprises at least a door implement;

a barrier implement frame, wherein said barrier implement frame comprises at least a door frame;

at least three or more bolt locks, wherein each of said bolt locks is configured to secure said barrier implement frame to said barrier implement in a locked position;

a knob implement, wherein said knob implement is configured to release each of said three or more bolt locks in an unlocked position;

at least three or more floating lock separator pinion connecting rods;

at least three or more spring-loaded sliding bolt connecting rods, wherein said spring-loaded sliding bolt connecting rods and said floating lock separator pinion connecting rods are configured to form a bolt lock releasing mechanism;

wherein each bolt lock releasing mechanism is configured to release each bolt lock into the unlocked position;

at least three or more floating lock separator pinion connecting wires, each of said floating lock separator pinion connecting wires is configured to engage each of said floating lock separator pinion connecting rods;

at least three or more spring-loaded sliding bolt connecting wires, each of said spring-loaded sliding bolt connecting wires is configured to engage each of said spring-loaded sliding bolt connecting rods;

a floating lock separator pinion connecting wire weak-link, wherein said floating lock separator pinion connecting wire weak-link is configured with each of said floating lock separator pinion connecting wires, wherein said floating lock separator pinion connecting wire weak-link is configured to break and separate said floating lock separator pinion connecting wire when said knob implement is compromised or broken by force;

a spring-loaded sliding bolt connecting wire weak-link, wherein said spring-loaded sliding bolt connecting wire weak-link is configured with each of said spring-loaded sliding bolt connecting wires, wherein said spring-loaded sliding bolt connecting wire weak-link is configured to break and separate said spring-loaded sliding bolt connecting wire when said knob implement is compromised or broken by force; and wherein said knob implement is configured to release each of said bolt locks out of their respective slots in said barrier implement frame by pulling each bolt lock releasing mechanism out of said slot.

20. A system comprising:

a barrier implement, wherein said barrier implement comprises a window implement;

a barrier implement frame, wherein said barrier implement frame comprises a window frame;

at least two or more bolt locks, wherein each of said two or more bolt locks is configured to secure said window implement to said window implement frame in a locked position;

a window knob implement, wherein said window knob implement is configured to release each of said bolt locks in an unlocked position;

at least two or more floating lock separator pinion connecting rods;

at least two or more spring-loaded sliding bolt connecting rods, wherein said spring-loaded sliding bolt connecting rods and said floating lock separator pinion connecting rods are configured to form a bolt lock releasing mechanism;

wherein each bolt lock releasing mechanism is configured to release each bolt lock in the unlocked position;

at least two or more floating lock separator pinion connecting wires, each of said floating lock separator pinion connecting wires is configured to engage each of said floating lock separator pinion connecting rods;

at least two or more spring-loaded sliding bolt connecting wires, each of said spring-loaded sliding bolt connecting wires is configured to engage each of said spring-loaded sliding bolt connecting rods;

a floating lock separator pinion connecting wire weak link, wherein said floating lock separator pinion connecting wire weak link is configured with each of said floating lock separator pinion connecting wires, wherein said floating lock separator pinion connecting wire weak link is configured to break and separate said floating lock separator pinion connecting wire when said knob implement is being compromised or broken by force;

a spring-loaded sliding bolt connecting wire weak link, wherein said spring-loaded sliding bolt connecting wire weak link is configured with each of said spring-loaded sliding bolt connecting wires, wherein said spring-loaded sliding bolt connecting wire weak link is configured to break and separate said spring-loaded sliding bolt connecting wire when said knob implement is being compromised or broken by force; and wherein said knob implement is configured to release each of said bolt locks out of their respective slots in said window frame by pulling each bolt lock releasing mechanism.

* * * * *